(12) United States Patent
Xiong et al.

(10) Patent No.: US 11,621,812 B2
(45) Date of Patent: Apr. 4, 2023

(54) SSB PATTERN AND DMRS DESIGN FOR PBCH IN 5G NR

(71) Applicant: Apple Inc., Cupertino, CA (US)

(72) Inventors: Gang Xiong, Cupertino, CA (US); Dae Won Lee, Cupertino, CA (US); Gregory Morozov, Cupertino, CA (US); Yushu Zhang, Beijing (CN); Jie Zhu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/819,849

(22) Filed: Mar. 16, 2020

(65) Prior Publication Data

US 2020/0295896 A1    Sep. 17, 2020

Related U.S. Application Data

(60) Provisional application No. 62/818,369, filed on Mar. 14, 2019.

(51) Int. Cl.
| | |
|---|---|
| *H04L 5/00* | (2006.01) |
| *H04J 3/02* | (2006.01) |
| *H04J 13/00* | (2011.01) |
| *H04W 72/04* | (2009.01) |
| *H04L 27/20* | (2006.01) |
| *H04L 27/26* | (2006.01) |
| *H04J 11/00* | (2006.01) |
| *H04W 72/0453* | (2023.01) |

(52) U.S. Cl.
CPC .............. *H04L 5/0048* (2013.01); *H04J 3/02* (2013.01); *H04J 13/0059* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 2013/0194931 A1* | 8/2013 | Lee | H04W 72/04 370/241 |
| 2018/0248642 A1* | 8/2018 | Si | H04L 5/0092 |
| 2018/0279292 A1* | 9/2018 | Luo | H04L 1/0028 |
| 2018/0302182 A1* | 10/2018 | Ly | H04L 27/2613 |
| 2019/0037509 A1* | 1/2019 | Li | H04W 56/001 |
| 2019/0357159 A1* | 11/2019 | Pan | H04L 1/1861 |
| 2019/0364523 A1* | 11/2019 | Wei | H04W 48/16 |
| 2020/0099500 A1* | 3/2020 | Huang | H04L 5/0051 |
| 2020/0154396 A1* | 5/2020 | Liu | H04W 56/00 |
| 2020/0196332 A1* | 6/2020 | Yokomakura | H04W 72/1268 |
| 2020/0367242 A1* | 11/2020 | Moon | H04L 1/00 |

FOREIGN PATENT DOCUMENTS

| | | | | |
|---|---|---|---|---|
| WO | WO-2018220854 A1 * | 12/2018 | | H04L 27/2613 |

\* cited by examiner

*Primary Examiner* — Jay L Vogel
(74) *Attorney, Agent, or Firm* — Fay Kaplun & Marcin, LLP

(57) ABSTRACT

Devices, systems and methods for a fifth generation (5G) or new radio (NR) system comprising multiplexing, by a gNodeB (gNB), a physical broadcast channel (PBCH) and an associated demodulation reference signal (DMRS) in a time division multiplexing (TDM) manner; and transmitting, by the gNB, the PBCH by employing a Discrete Fourier Transform-spread-orthogonal frequency-division multiplexing (DFT-s-OFDM) waveform and its associated DMRS.

20 Claims, 10 Drawing Sheets

SSB PATTERN AND DMRS DESIGN FOR PBCH IN 5G NR

PRIORITY CLAIM

The present disclosure claims priority to U.S. Prov. Appln. Ser. No. 62/818,369 filed Mar. 14, 2019; the disclosure of which is incorporated herewith by reference.

BACKGROUND

In 5G NR, the synchronization signal block (SSB) consists of a primary synchronization signal (PSS), a secondary synchronization signal (SSS), and a physical broadcast signal (PBCH). In NR Release 15, a system design is targeted for carrier frequencies up to 52.6 GHz with a waveform choice of cyclic-prefix orthogonal frequency division multiplexing (CP-OFDM) for DL and UL, and additionally, a Discrete Fourier Transform-spread-OFDM (DFT-s-OFDM) for UL. However, for carrier frequency above 52.6 GHz, a single waveform choice may be needed to handle issues including low power amplifier (PA) efficiency and large phase noise may make a choice of waveforms.

SUMMARY

The exemplary embodiments relate to a method of wireless communication for a fifth generation (5G) or new radio (NR) system comprising multiplexing, by a gNodeB (gNB), a physical broadcast channel (PBCH) and an associated demodulation reference signal (DMRS) in a time division multiplexing (TDM) manner; and transmitting, by the gNB, the PBCH by employing a Discrete Fourier Transform-spread-orthogonal frequency-division multiplexing (DFT-s-OFDM) waveform and its associated DMRS.

The exemplary embodiments further relate to a method of operating a gNB in a fifth generation (5G) new radio (NR) system comprising multiplexing a physical broadcast channel (PBCH) and a secondary synchronization signal (SSS) in a time division multiplexing (TDM) manner; and transmitting, or causing transmission of, the PBCH and the SSS by employing a Discrete Fourier Transform-spread-orthogonal frequency-division multiplexing (DFT-s-OFDM) waveform.

The exemplary embodiments further relate to a base station comprising baseband circuitry configured for multiplexing a physical broadcast channel (PBCH) and an associated demodulation reference signal (DMRS) in a time division multiplexing (TDM) manner; and radio front end circuitry configured for transmitting the PBCH by employing a Discrete Fourier Transform-spread-orthogonal frequency-division multiplexing (DFT-s-OFDM) waveform and its associated DMRS.

DETAILED DESCRIPTION

Figure 1:
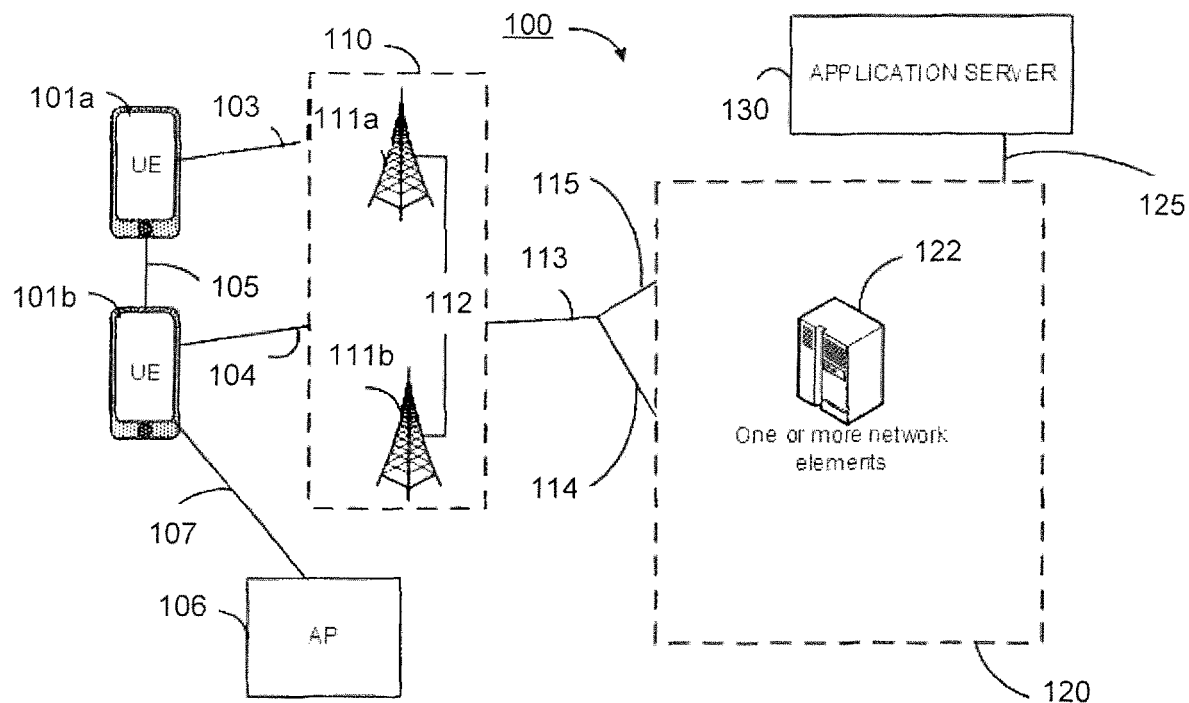
FIG. 1 illustrates an example architecture of a system of a network in accordance with various exemplary embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The exemplary embodiments may be further understood with reference to the following description and the related appended drawings and slides, wherein like elements are provided with the same reference numerals. The exemplary embodiments describe devices, systems and methods for transmitting a synchronization signal block (SSB) on the downlink in a 5G NR network arrangement.

Figure 7:
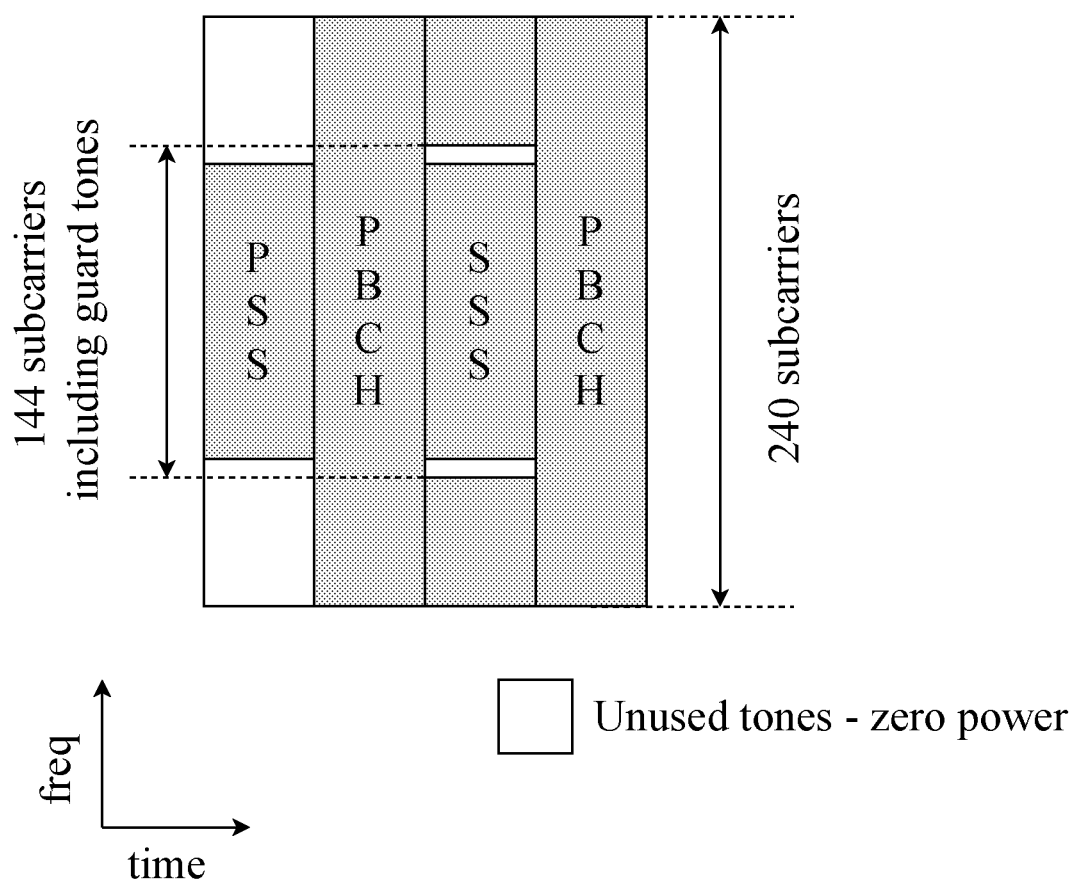
FIG. 7 illustrates an SSB pattern in 5G NR.

In 5G NR, the synchronization signal block (SSB) consists of a primary synchronization signal (PSS), a secondary synchronization signal (SSS), and a physical broadcast signal (PBCH). As shown in FIG. 7, the SSB spans 4 symbols and occupies 240 subcarriers (20 physical resource blocks (PRB)) within one slot and the SSB symbol follows the order of PSS, PBCH, SSS and PBCH. Further, the PSS and SSS span 1 orthogonal frequency-division multiplexing (OFDM) symbol and occupy 12 PRBs. The PSS is defined based on a length-127 BPSK modulated M-sequence, which is used to provide an OFDM symbol timing estimate, a coarse frequency offset estimate and partial cell ID information. The SSS has 1008 sequences and is defined based on a length-127 BPSK modulated and XOR of two M-sequences, which is used to provide cell identity.

In 5G NR, the PBCH occupies 20 PRBs in frequency in non-SSS OFDM symbols within one SSB. In an SSS OFDM symbol, an additional 8 PRBs are used for PBCH transmission. In particular, the PBCH is used to provide timing information including an OFDM symbol index, a slot index in a radio frame and a radio frame number from an SSB. In addition, it is used to carry part of the Minimum System Information (MSI), and control configuration information for the remaining MSI (RMSI).

In NR Release 15, a system design is targeted for carrier frequencies up to 52.6 GHz with a waveform choice of cyclic-prefix orthogonal frequency division multiplexing (CP-OFDM) for DL and UL, and additionally, a Discrete Fourier Transform-spread-OFDM (DFT-s-OFDM) for UL. However, for carrier frequency above 52.6 GHz, it is envisioned that a single carrier-based waveform is needed to handle issues including low power amplifier (PA) efficiency and large phase noise.

For a single carrier-based waveform, DFT-s-OFDM and single carrier with frequency domain equalizer (SC-FDE) can be considered for both DL and UL. For an OFDM-based transmission scheme including DFT-s-OFDM, a cyclic prefix (CP) is inserted at the beginning of each block, where the last data symbols in a block are repeated as the CP. Typically, the length of the CP exceeds the maximum expected delay spread in order to overcome the inter-symbol interference (ISI).

If DFT-s-OFDM is used for the transmission of the PBCH, the SSB pattern and PBCH need to be redesigned to keep a low peak-to-average power ratio (PAPR) for the DL. The exemplary embodiments described herein disclose synchronization signal block (SSB) patterns and Demodulation reference signal (DMRS) designs for the physical broadcast channel (PBCH) for system operations above a 52.6 GHz carrier frequency. In particular, a synchronization signal block (SSB) pattern for DFT-s-OFDM waveform and a DMRS design for PBCH for a DFT-s-OFDM based waveform are disclosed.

System Architecture

FIG. 1 illustrates an example architecture of a system 100 of a network in accordance with various exemplary embodiments. The following description is provided for an example system 100 that operates in conjunction with the 5G NR system standards as provided by 3GPP technical specifications. However, the exemplary embodiments are not limited in this regard and the described embodiments may apply to other networks that benefit from the principles described herein, such as legacy (e.g. LTE) 3GPP systems, future 3GPP systems (e.g., Sixth Generation (6G) systems), IEEE 802.16 protocols (e.g., WMAN, WiMAX, etc.), or the like.

As shown in FIG. 1, the system 100 includes UE 101*a* and UE 101*b* (collectively referred to as "UEs 101" or "UE 101"). In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 101 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 may be configured to connect, e.g., communicatively couple, with a radio access network (RAN) 110. In some embodiments, the RAN 110 may be a 5G NR RAN, while in other embodiments the RAN 110 may be an E-UTRAN or a legacy RAN, such as a UTRAN or GERAN. As used herein, the term "5G NR RAN" or the like may refer to a RAN 110 that operates in an NR or 5G system 100, and the term "E-UTRAN" or the like may refer to a RAN 110 that operates in an LTE or 4G system 100. The UEs 101 utilize connections (or channels) 103 and 104, respectively, each of which comprises a physical communications interface or layer (discussed in further detail below).

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 101 may directly exchange communication data via a Proximity Services (ProSe) interface 105. The ProSe interface 105 may alternatively be referred to as a SL interface 105 and may comprise one or more logical channels, including but not limited to a PSCCH, a PSSCH, a PSDCH, and a PSBCH.

The UE 101*b* is further configured to access a WLAN node 106 (also referred to as "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router.

The RAN 110 includes one or more RAN nodes 111*a* and 111*b* (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as base stations (BSs), next generation NodeBs (gNBs), RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "5G NR RAN node" or the like may refer to a RAN node 111 that operates in an NR or 5G system 100 (for example, a gNB), and the term "E-UTRAN node" or the like may refer to a RAN node 111 that operates in an LTE or 4G system 100 (e.g., an eNB). According to various embodiments, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 111 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 may represent individual gNB-DUs that are connected to a gNB-CU via individual F1 interfaces (not shown by FIG. 1). In these implementations, the gNB-DUs may include one or more remote radio heads or RFEMs (see, e.g., RFEM 215 in FIG. 2), and the gNB-CU may be operated by a server (not shown) that is located in the RAN 110 or by a server pool in a similar manner as the CRAN/vBBUP. Additionally or alternatively, one or more of the RAN nodes 111 may be next generation eNBs (ng-eNBs), which are RAN nodes that provide E-UTRA user plane and control plane protocol terminations toward the UEs 101, and are connected to a 5GC via a 5G NR interface.

In V2X scenarios one or more of the RAN nodes 111 may be or act as Road Side Units (RSUs). The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In some exemplary embodiments, the UEs 101 can be configured to communicate using OFDM communication signals with each other or with any of the RAN nodes 111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 101 and the RAN nodes 111 may operate using LAA, eLAA, and/or feLAA mechanisms. In these implementations, the UEs 101 and the RAN nodes 111 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

Listen before talk (LBT) is a mechanism whereby equipment (for example, UEs 101 RAN nodes 111, etc.) senses a medium (for example, a channel or carrier frequency) and transmits when the medium is sensed to be idle (or when a specific channel in the medium is sensed to be unoccupied). The medium sensing operation may include clear channel assessment (CCA), which utilizes at least energy detection (ED) to determine the presence or absence of other signals on a channel in order to determine if a channel is occupied or clear. This LBT mechanism allows cellular/LAA (licensed assisted access) networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 101, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon carrier aggregation (CA) technologies of LTE-Advanced systems. In CA, each aggregated carrier is referred to as a component carrier (CC). A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 101. The PDCCH carries information about the transport format and resource allocations related to the PDSCH channel, among other things. It may also inform the UEs 101 about the transport format, resource allocation, and HARQ information related to the uplink shared channel. Typically, downlink scheduling (assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH uses control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 111 may be configured to communicate with one another via interface 112. In embodiments where the system 100 is an LTE system, the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP protocol data units (PDUs) to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system, the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP—U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network (CN) 120. The CN 120 may comprise a plurality of network elements 122, which are configured to offer various data and telecommunications services to customers/subscribers (e.g., users of UEs 101) who are connected to the CN 120 via the RAN 110. The components of the CN 120 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 130 may be an element offering applications that use IP bearer resources with the core network (e.g., UMTS PS domain, LTE PS data services, etc.). The application server 130 can also be configured to support one or more communication services (e.g., VoIP sessions, PTT sessions, group communication sessions, social networking services, etc.) for the UEs 101 via the CN 120.

In embodiments, the CN 120 may be a 5GC (referred to as "5GC 120" or the like), and the RAN 110 may be connected with the CN 120 via a 5G NR interface 113. In embodiments, the 5G NR interface 113 may be split into two parts, a 5G NR user plane (NG-U) interface 114, which carries traffic data between the RAN nodes 111 and a UPF, and the S1 control plane (NG-C) interface 115, which is a signaling interface between the RAN nodes 111 and the AMF.

In embodiments, the CN 120 may be a 5G CN (referred to as "5GC 120" or the like), while in other embodiments, the CN 120 may be an EPC). Where the CN 120 is an evolved packet core (EPC) (referred to as "EPC 120" or the like), the RAN 110 may be connected with the CN 120 via an S1 interface 113. In embodiments, the S1 interface 113 may be split into two parts, an S1 user plane (S1-U) interface 114, which carries traffic data between the RAN nodes 111 and the S-GW, and the S1-MME interface 115, which is a signaling interface between the RAN nodes 111 and the MME.

Devices/Components

Figure 2:
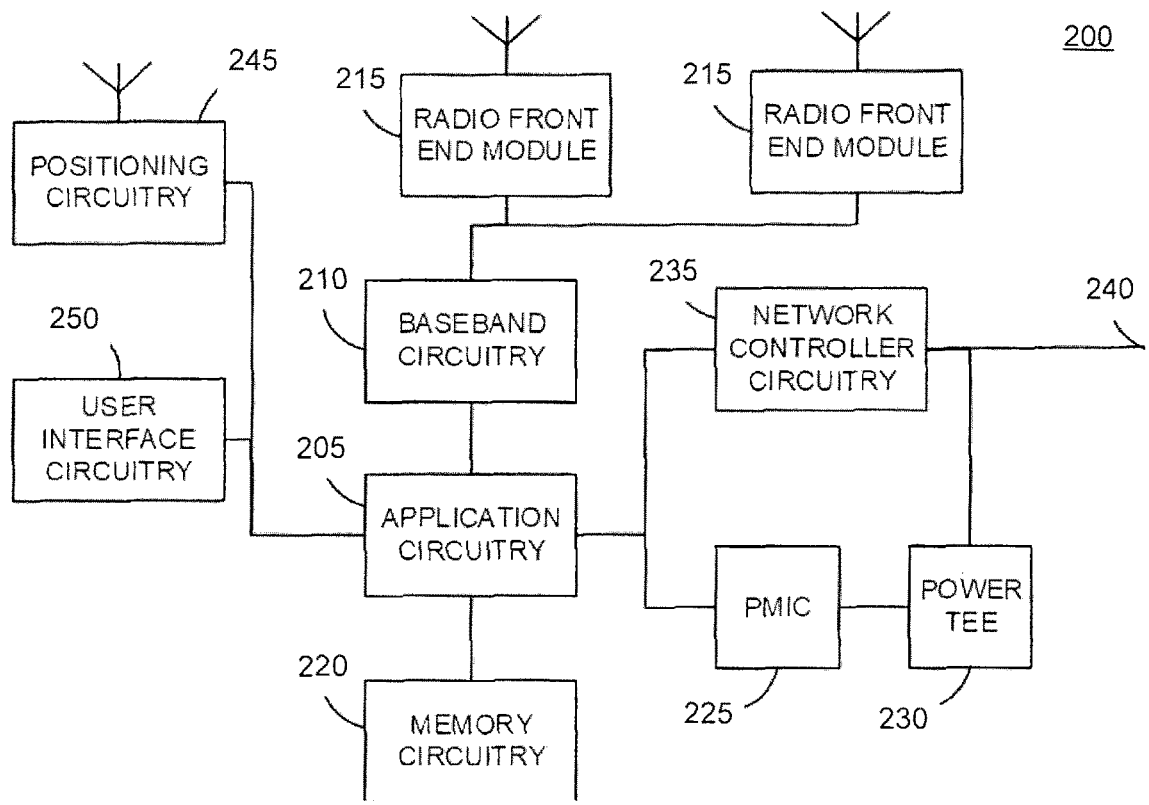
FIG. 2 illustrates an example of infrastructure equipment in accordance with various exemplary embodiments.

FIG. 2 illustrates an example of infrastructure equipment 200 in accordance with various exemplary embodiments. The infrastructure equipment 200 (or "system 200") may be implemented as a base station, radio head, RAN node such as the RAN nodes 111 and/or WLAN node 106 shown and described previously, application server(s) 130, and/or any other element/device discussed herein. In other examples, the system 200 could be implemented in or by a UE.

The system 200 includes application circuitry 205, baseband circuitry 210, one or more radio front end modules (RFEMs) 215, memory circuitry 220, power management integrated circuitry (PMIC) 225, power tee circuitry 230, network controller circuitry 235, network interface connector 240, satellite positioning circuitry 245, and a user interface 250. In some embodiments, the device 200 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 205 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 205 may be coupled with or may include memory/storage elements and may be configured to execute instructions stored in the memory/storage to enable various applications or operating systems to run on the system 200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 205 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 205 may comprise, or may be, a special-purpose processor/controller to operate according to the various embodiments herein. As examples, the processor(s) of application circuitry 205 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 200 may not utilize application circuitry 205, and instead may include a special-purpose processor/controller to process IP data received from an EPC or 5GC, for example.

In some implementations, the application circuitry 205 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 205 may comprise logic blocks or logic fabric, and other interconnected resources that may be programmed to perform various functions, such as the procedures, methods, functions, etc. of the various embodiments discussed herein. In such embodiments, the circuitry of application circuitry 205 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 210 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 210 are discussed infra with regard to FIG. 4.

User interface circuitry 250 may include one or more user interfaces designed to enable user interaction with the system 200 or peripheral component interfaces designed to enable peripheral component interaction with the system 200. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 215 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 411 of FIG. 4 infra), and the RFEM may be connected to multiple antennas. In alternative implementations, both mmWave and sub-mmWave radio functions may be implemented in the same physical RFEM 215, which incorporates both mmWave antennas and sub-mmWave.

The memory circuitry 220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 220 may be implemented as one or more of solder down packaged integrated circuits, socketed memory modules and plug-in memory cards.

The PMIC 225 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 230 may provide for electrical power drawn from a network cable to provide both power supply and data connectivity to the infrastructure equipment 200 using a single cable.

The network controller circuitry 235 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 200 via network interface connector 240 using a physical connection, which may be electrical (commonly referred to as a "copper interconnect"), optical, or wireless. The network controller circuitry 235 may include one or more dedicated processors and/or FPGAs to communicate using one or more of the aforementioned protocols. In some implementations, the network controller circuitry 235 may include multiple controllers to provide connectivity to other networks using the same or different protocols.

The positioning circuitry 245 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 245 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 245 may include a Micro-Technology for Positioning, Navigation, and Timing (Micro-PNT) IC that uses a master timing clock to perform position tracking/estimation without GNSS assistance. The positioning circuitry 245 may also be part of, or interact with, the baseband circuitry 210 and/or RFEMs 215 to communicate with the nodes and components of the positioning network. The positioning circuitry 245 may also provide position data and/or time data to the application circuitry 205, which may use the data to synchronize operations with various infrastructure (e.g., RAN nodes 111, etc.), or the like.

The components shown by FIG. 2 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 3:
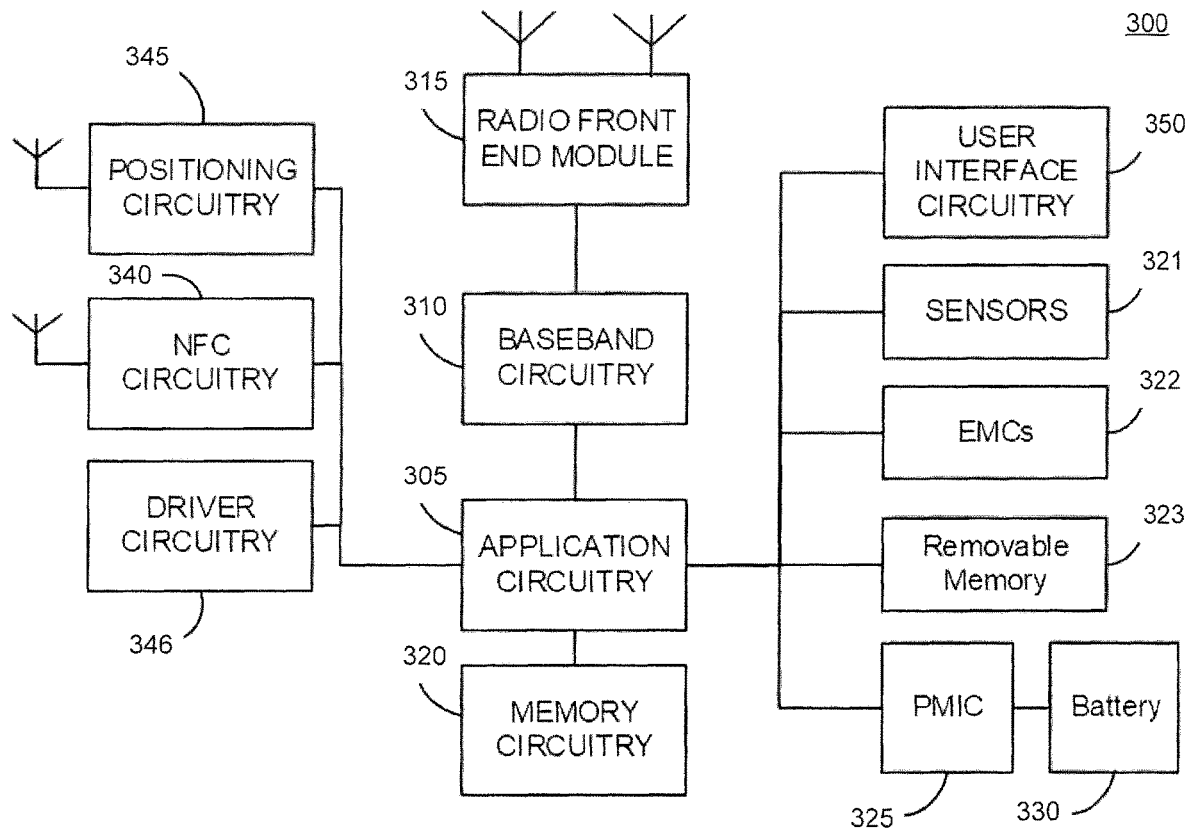
FIG. 3 illustrates an example of a platform (or "device") in accordance with various exemplary embodiments.

FIG. 3 illustrates an example of a platform 300 (or "device 300") in accordance with various exemplary embodiments. In embodiments, the computer platform 300 may be suitable for use as UEs 101, application servers 130, and/or any other element/device discussed herein. The platform 300 may include any combinations of the components shown in the example. The components of platform 300 may be implemented as integrated circuits (ICs), portions thereof, discrete electronic devices, or other modules, logic, hardware, software, firmware, or a combination thereof adapted in the computer platform 300, or as components otherwise incorporated within a chassis of a larger system. The block diagram of FIG. 3 is intended to show a high level view of components of the computer platform 300. However, some of the components shown may be omitted, additional components may be present, and different arrangement of the components shown may occur in other implementations.

Application circuitry 305 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 305 may be coupled with or may include memory/storage elements and may be configured to execute instructions stored in the memory/storage to enable various applications or operating systems to run on the system 300. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 305 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 305 may comprise, or may be, a special-purpose processor/controller to operate according to the various embodiments herein.

As examples, the processor(s) of application circuitry 305 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 305 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 305 may be a part of a system on a chip (SoC) in which the application circuitry 305 and other components are formed into a single integrated circuit, or a single package, such as the Edison™ or Galileo™ SoC boards from Intel® Corporation.

Additionally or alternatively, application circuitry 305 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 305 may comprise logic blocks or logic fabric, and other interconnected resources that may be programmed to perform various functions, such as the procedures, methods, functions, etc. of the various embodiments discussed herein. In such embodiments, the circuitry of application circuitry 305 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 310 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 310 are discussed infra with regard to FIG. 4.

The RFEMs 315 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 411 of FIG. 4 infra), and the RFEM may be connected to multiple antennas. In alternative implementations, both mmWave and sub-mmWave radio functions may be implemented in the same physical RFEM 315, which incorporates both mmWave antennas and sub-mmWave.

The memory circuitry 320 may include any number and type of memory devices used to provide for a given amount of system memory. As examples, the memory circuitry 320 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 320 may be developed in accordance with a Joint Electron Devices Engineering Council (JEDEC) low power double data rate (LPDDR)-based design, such as LPDDR2, LPDDR3, LPDDR4, or the like. Memory circuitry 320 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 320 may be on-die memory or registers associated with the application circuitry 305. To provide for persistent storage of information such as data, applications, operating systems and so forth, memory circuitry 320 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 300 may incorporate the three-dimensional (3D) cross-point (XPOINT) memories from Intel® and Micron®.

Removable memory circuitry 323 may include devices, circuitry, enclosures/housings, ports or receptacles, etc. used to couple portable data storage devices with the platform 300. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 300 may also include interface circuitry (not shown) that is used to connect external devices with the platform 300. The external devices connected to the platform 300 via the interface circuitry include sensor circuitry 321 and electro-mechanical components (EMCs) 322, as well as removable memory devices coupled to removable memory circuitry 323.

The sensor circuitry 321 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 322 include devices, modules, or subsystems whose purpose is to enable platform 300 to change its state, position, and/or orientation, or move or control a mechanism or (sub)system. Additionally, EMCs 322 may be configured to generate and send messages/signaling to other components of the platform 300 to indicate a current state of the EMCs 322. Examples of the EMCs 322 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 300 is configured to operate one or more EMCs 322 based on one or more captured events and/or instructions or control signals received from a service provider and/or various clients.

In some implementations, the interface circuitry may connect the platform 300 with positioning circuitry 345. The positioning circuitry 345 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 345 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 345 may include a Micro-PNT IC that uses a master timing clock to perform position tracking/estimation without GNSS assistance. The positioning circuitry 345 may also be part of, or interact with, the baseband circuitry 310 and/or RFEMs 315 to communicate with the nodes and components of the positioning network. The positioning circuitry 345 may also provide position data and/or time data to the application circuitry 305, which may use the data to synchronize operations with various infrastructure (e.g., radio base stations), for turn-by-turn navigation applications, or the like.

In some implementations, the interface circuitry may connect the platform 300 with Near-Field Communication (NFC) circuitry 340. NFC circuitry 340 is configured to provide contactless, short-range communications based on radio frequency identification (RFID) standards, wherein magnetic field induction is used to enable communication between NFC circuitry 340 and NFC-enabled devices external to the platform 300 (e.g., an "NFC touchpoint"). NFC circuitry 340 comprises an NFC controller coupled with an antenna element and a processor coupled with the NFC controller. The NFC controller may be a chip/IC providing NFC functionalities to the NFC circuitry 340 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 340, or initiate data transfer between the NFC circuitry 340 and another active NFC device (e.g., a smartphone or an NFC-enabled POS terminal) that is proximate to the platform 300.

The driver circuitry 346 may include software and hardware elements that operate to control particular devices that are embedded in the platform 300, attached to the platform 300, or otherwise communicatively coupled with the platform 300. The driver circuitry 346 may include individual drivers allowing other components of the platform 300 to interact with or control various input/output (I/O) devices that may be present within, or connected to, the platform 300. For example, driver circuitry 346 may include a display driver to control and allow access to a display device, a touchscreen driver to control and allow access to a touchscreen interface of the platform 300, sensor drivers to obtain sensor readings of sensor circuitry 321 and control and allow access to sensor circuitry 321, EMC drivers to obtain actuator positions of the EMCs 322 and/or control and allow access to the EMCs 322, a camera driver to control and allow access to an embedded image capture device, audio drivers to control and allow access to one or more audio devices.

The power management integrated circuitry (PMIC) 325 (also referred to as "power management circuitry 325") may manage power provided to various components of the platform 300. In particular, with respect to the baseband circuitry 310, the PMIC 325 may control power-source selection, voltage scaling, battery charging, or DC-to-DC conversion. The PMIC 325 may often be included when the platform 300 is capable of being powered by a battery 330, for example, when the device is included in a UE 101.

In some embodiments, the PMIC 325 may control, or otherwise be part of, various power saving mechanisms of the platform 300. For example, if the platform 300 is in an RRC Connected state, where it is still connected to the RAN node as it expects to receive traffic shortly, then it may enter a state known as Discontinuous Reception Mode (DRX) after a period of inactivity. During this state, the platform 300 may power down for brief intervals of time and thus save power. If there is no data traffic activity for an extended period of time, then the platform 300 may transition off to an RRC Idle state, where it disconnects from the network and does not perform operations such as channel quality feedback, handover, etc. The platform 300 goes into a very low power state and it performs paging where again it periodically wakes up to listen to the network and then powers down again. The platform 300 may not receive data in this state; in order to receive data, it must transition back to RRC Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 330 may power the platform 300, although in some examples the platform 300 may be mounted deployed in a fixed location, and may have a power supply coupled to an electrical grid. The battery 330 may be a lithium ion battery, a metal-air battery, such as a zinc-air battery, an aluminum-air battery, a lithium-air battery, and the like. In some implementations, such as in V2X applications, the battery 330 may be a typical lead-acid automotive battery.

In some implementations, the battery 330 may be a "smart battery," which includes or is coupled with a Battery Management System (BMS) or battery monitoring integrated circuitry. The BMS may be included in the platform 300 to track the state of charge (SoCh) of the battery 330. The EMS may be used to monitor other parameters of the battery 330 to provide failure predictions, such as the state of health (SoH) and the state of function (SoF) of the battery 330. The BMS may communicate the information of the battery 330 to the application circuitry 305 or other components of the platform 300. The BMS may also include an analog-to-digital (ADC) convertor that allows the application circuitry 305 to directly monitor the voltage of the battery 330 or the current flow from the battery 330. The battery parameters may be used to determine actions that the platform 300 may perform, such as transmission frequency, network operation, sensing frequency, and the like.

A power block, or other power supply coupled to an electrical grid may be coupled with the BMS to charge the battery 330. In some examples, the power block may be replaced with a wireless power receiver to obtain the power wirelessly, for example, through a loop antenna in the computer platform 300. In these examples, a wireless battery charging circuit may be included in the BMS. The specific charging circuits chosen may depend on the size of the battery 330, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 350 includes various input/output (I/O) devices present within, or connected to, the platform 300, and includes one or more user interfaces designed to enable user interaction with the platform 300 and/or peripheral component interfaces designed to enable peripheral component interaction with the platform 300. The user interface circuitry 350 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position (s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 300. The output device circuitry may also include speakers or other audio emitting devices, printer(s), and/or the like. In some embodiments, the sensor circuitry 321 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 300 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 4:
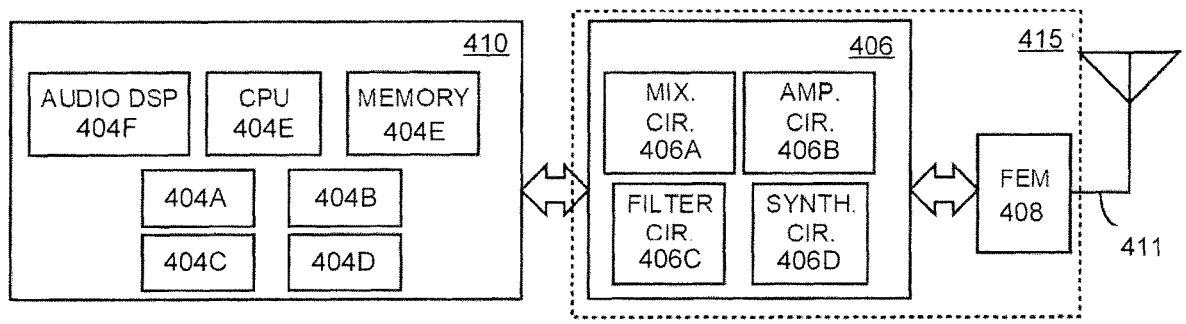
FIG. 4 illustrates example components of baseband circuitry and radio front end modules (RFEM) in accordance with various exemplary embodiments.

FIG. 4 illustrates example components of baseband circuitry 410 and radio front end modules (RFEM) 415 in accordance with various exemplary embodiments. The baseband circuitry 410 corresponds to the baseband circuitry 210 and 310 of FIGS. 2 and 3, respectively. The RFEM 415 corresponds to the RFEM 215 and 315 of FIGS. 2 and 3, respectively. As shown, the RFEMs 415 may include Radio Frequency (RF) circuitry 406, front-end module (FEM) circuitry 408, antenna array 411 coupled together at least as shown.

The baseband circuitry 410 includes circuitry and/or control logic configured to carry out various radio/network protocol and radio control functions that enable communication with one or more radio networks via the RF circuitry 406. The radio control functions may include, but are not limited to, signal modulation/demodulation, encoding/decoding, radio frequency shifting, etc. In some embodiments, modulation/demodulation circuitry of the baseband circuitry 410 may include Fast-Fourier Transform (FFT), precoding, or constellation mapping/demapping functionality. In some embodiments, encoding/decoding circuitry of the baseband circuitry 410 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 410 is configured to process baseband signals received from a receive signal path of the RF circuitry 406 and to generate baseband signals for a transmit signal path of the RF circuitry 406. The baseband circuitry 410 is configured to interface with application circuitry 205/305 (see FIGS. 2 and 3) for generation and processing of the baseband signals and for controlling operations of the RF circuitry 406. The baseband circuitry 410 may handle various radio control functions.

The aforementioned circuitry and/or control logic of the baseband circuitry 410 may include one or more single or multi-core processors. For example, the one or more processors may include a 3G baseband processor 404A, a 4G/LTE baseband processor 404B, a 5G/NR baseband processor 404C, or some other baseband processor(s) 404D for other existing generations, generations in development or to be developed in the future (e.g., sixth generation (6G), etc.). In other embodiments, some or all of the functionality of baseband processors 404A-D may be included in modules stored in the memory 404G and executed via a Central Processing Unit (CPU) 404E. In other embodiments, some or all of the functionality of baseband processors 404A-D may be provided as hardware accelerators (e.g., FPGAs, ASICs, etc.) loaded with the appropriate bit streams or logic blocks stored in respective memory cells. In various embodiments, the memory 404G may store program code of a real-time OS (RTOS), which when executed by the CPU 404E (or other baseband processor), is to cause the CPU 404E (or other baseband processor) to manage resources of the baseband circuitry 410, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 410 includes one or more audio digital signal processor(s) (DSP) 404F. The audio DSP(s) 404F include elements for compression/decompression and echo cancellation and may include other suitable processing elements in other embodiments.

In some embodiments, each of the processors 404A-404E include respective memory interfaces to send/receive data to/from the memory 404G. The baseband circuitry 410 may further include one or more interfaces to communicatively couple to other circuitries/devices, such as an interface to send/receive data to/from memory external to the baseband circuitry 410; an application circuitry interface to send/receive data to/from the application circuitry 205/305 of FIGS. 2-3); an RF circuitry interface to send/receive data to/from RF circuitry 406 of FIG. 4; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 325.

In alternate embodiments (which may be combined with the above described embodiments), baseband circuitry 410 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 410 may include protocol processing circuitry with one or more instances of control circuitry (not shown) to provide control functions for the digital baseband circuitry and/or radio frequency circuitry (e.g., the radio front end modules 415).

Although not shown by FIG. 4, in some embodiments, the baseband circuitry 410 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 410 and/or RF circuitry 406 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 410 and/or RF circuitry 406 are part of a Wi-Fi communication system. In the second example, the protocol processing circuitry would operate Wi-Fi MAC and logical link control (LLC) functions. The protocol processing circuitry may include one or more memory structures (e.g., 404G) to store program code and data for operating the protocol functions, as well as one or more processing cores to execute the program code and perform various operations using the data. The baseband circuitry 410 may also support radio communications for more than one wireless protocol.

The various hardware elements of the baseband circuitry 410 discussed herein may be implemented, for example, as a solder-down substrate including one or more integrated circuits (ICs), a single packaged IC soldered to a main circuit board or a multi-chip module containing two or more ICs. In one example, the components of the baseband circuitry 410 may be suitably combined in a single chip or chipset, or disposed on a same circuit board. In another example, some or all of the constituent components of the baseband circuitry 410 and RF circuitry 406 may be implemented together such as, for example, a system on a chip (SoC) or System-in-Package (SiP). In another example, some or all of the constituent components of the baseband circuitry 410 may be implemented as a separate SoC that is communicatively coupled with and RF circuitry 406 (or multiple instances of RF circuitry 406). In yet another example, some or all of the constituent components of the baseband circuitry 410 and the application circuitry 205/305 may be implemented together as individual SoCs mounted to a same circuit board (e.g., a "multi-chip package").

In some embodiments, the baseband circuitry 410 may provide for communication compatible with one or more radio technologies. For example, in some embodiments, the baseband circuitry 410 may support communication with an E-UTRAN or other WMAN, a WLAN, a WPAN. Embodiments in which the baseband circuitry 410 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path, which may include circuitry to down-convert RF signals received from the FEM circuitry 408 and provide baseband signals to the baseband circuitry 410. RF circuitry 406 may also include a transmit signal path, which may include circuitry to up-convert baseband signals provided by the baseband circuitry 410 and provide RF output signals to the FEM circuitry 408 for transmission.

In some embodiments, the receive signal path of the RF circuitry 406 may include mixer circuitry 406a, amplifier circuitry 406b and filter circuitry 406c. In some embodiments, the transmit signal path of the RF circuitry 406 may include filter circuitry 406c and mixer circuitry 406a. RF circuitry 406 may also include synthesizer circuitry 406d for synthesizing a frequency for use by the mixer circuitry 406a of the receive signal path and the transmit signal path. In some embodiments, the mixer circuitry 406a of the receive signal path may be configured to down-convert RF signals received from the FEM circuitry 408 based on the synthesized frequency provided by synthesizer circuitry 406d. The amplifier circuitry 406b may be configured to amplify the down-converted signals and the filter circuitry 406c may be a low-pass filter (LPF) or band-pass filter (BPF) configured to remove unwanted signals from the down-converted signals to generate output baseband signals. Output baseband signals may be provided to the baseband circuitry 410 for further processing. In some embodiments, the output baseband signals may be zero-frequency baseband signals, although this is not a requirement. In some embodiments, mixer circuitry 406a of the receive signal path may comprise passive mixers, although the scope of the embodiments is not limited in this respect.

In some embodiments, the mixer circuitry 406a of the transmit signal path may be configured to up-convert input baseband signals based on the synthesized frequency provided by the synthesizer circuitry 406d to generate RF output signals for the FEM circuitry 408. The baseband signals may be provided by the baseband circuitry 410 and may be filtered by filter circuitry 406c.

In some embodiments, the mixer circuitry 406a of the receive signal path and the mixer circuitry 406a of the transmit signal path may include two or more mixers and may be arranged for quadrature downconversion and upconversion, respectively. In some embodiments, the mixer circuitry 406a of the receive signal path and the mixer circuitry 406a of the transmit signal path may include two or more mixers and may be arranged for image rejection (e.g., Hartley image rejection). In some embodiments, the mixer circuitry 406a of the receive signal path and the mixer circuitry 406a of the transmit signal path may be arranged for direct downconversion and direct upconversion, respectively. In some embodiments, the mixer circuitry 406a of the receive signal path and the mixer circuitry 406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 410 may include a digital baseband interface to communicate with the RF circuitry 406.

In some dual-mode embodiments, a separate radio IC circuitry may be provided for processing signals for each spectrum, although the scope of the embodiments is not limited in this respect.

In some embodiments, the synthesizer circuitry 406d may be a fractional-N synthesizer or a fractional N/N+1 synthesizer, although the scope of the embodiments is not limited in this respect as other types of frequency synthesizers may be suitable. For example, synthesizer circuitry 406d may be a delta-sigma synthesizer, a frequency multiplier, or a synthesizer comprising a phase-locked loop with a frequency divider.

The synthesizer circuitry 406d may be configured to synthesize an output frequency for use by the mixer circuitry 406a of the RF circuitry 406 based on a frequency input and a divider control input. In some embodiments, the synthesizer circuitry 406d may be a fractional N/N+1 synthesizer.

In some embodiments, frequency input may be provided by a voltage controlled oscillator (VCO), although that is not a requirement. Divider control input may be provided by either the baseband circuitry 410 or the application circuitry 205/305 depending on the desired output frequency. In some embodiments, a divider control input (e.g., N) may be determined from a look-up table based on a channel indicated by the application circuitry 205/305.

Synthesizer circuitry 406d of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 406 may include an IQ/polar converter.

FEM circuitry 408 may include a receive signal path, which may include circuitry configured to operate on RF signals received from antenna array 411, amplify the received signals and provide the amplified versions of the received signals to the RF circuitry 406 for further processing. FEM circuitry 408 may also include a transmit signal path, which may include circuitry configured to amplify signals for transmission provided by the RF circuitry 406 for transmission by one or more of antenna elements of antenna array 411. In various embodiments, the amplification through the transmit or receive signal paths may be done solely in the RF circuitry 406, solely in the FEM circuitry 408, or in both the RF circuitry 406 and the FEM circuitry 408.

In some embodiments, the FEM circuitry 408 may include a TX/RX switch to switch between transmit mode and receive mode operation. The FEM circuitry 408 may include a receive signal path and a transmit signal path. The receive signal path of the FEM circuitry 408 may include an LNA to amplify received RF signals and provide the amplified received RF signals as an output (e.g., to the RF circuitry 406). The transmit signal path of the FEM circuitry 408 may include a power amplifier (PA) to amplify input RF signals (e.g., provided by RF circuitry 406), and one or more filters to generate RF signals for subsequent transmission by one or more antenna elements of the antenna array 411.

The antenna array 411 comprises one or more antenna elements, each of which is configured convert electrical signals into radio waves to travel through the air and to convert received radio waves into electrical signals. For example, digital baseband signals provided by the baseband circuitry 410 is converted into analog RF signals (e.g., modulated waveform) that will be amplified and transmitted via the antenna elements of the antenna array 411 including one or more antenna elements (not shown). The antenna elements may be omnidirectional, direction, or a combination thereof. The antenna elements may be formed in a multitude of arranges as are known and/or discussed herein. The antenna array 411 may comprise microstrip antennas or printed antennas that are fabricated on the surface of one or more printed circuit boards. The antenna array 411 may be formed in as a patch of metal foil (e.g., a patch antenna) in a variety of shapes, and may be coupled with the RF circuitry 406 and/or FEM circuitry 408 using metal transmission lines or the like.

Processors of the application circuitry 205/305 and processors of the baseband circuitry 410 may be used to execute elements of one or more instances of a protocol stack. For example, processors of the baseband circuitry 410, alone or in combination, may be used execute Layer 3, Layer 2, or Layer 1 functionality, while processors of the application circuitry 205/305 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 5:
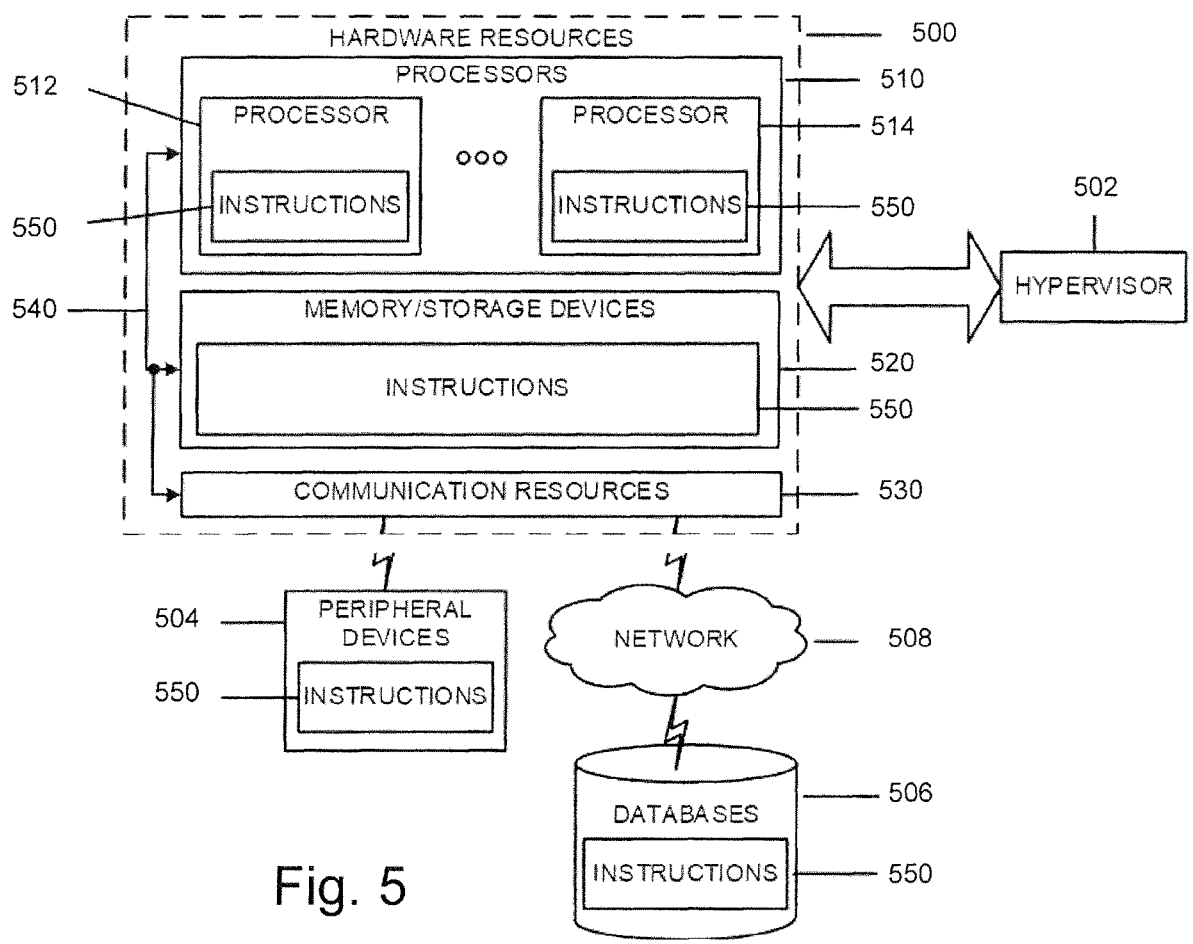
FIG. 5 is a block diagram illustrating components, according to some example embodiments, able to read instructions from a machine-readable or computer-readable medium (e.g., a non-transitory machine-readable storage medium) and perform any one or more of the methodologies discussed herein.

FIG. 5 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 5 shows a diagrammatic representation of hardware resources 500 including one or more processors (or processor cores) 510, one or more memory/storage devices 520, and one or more communication resources 530, each of which may be communicatively coupled via a bus 540. For embodiments where node virtualization (e.g., NFV) is utilized, a hypervisor 502 may be executed to provide an execution environment for one or more network slices/sub-slices to utilize the hardware resources 500.

The processors 510 may include, for example, a processor 512 and a processor 514. The processor(s) 510 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 520 may include main memory, disk storage, or any suitable combination thereof. The memory/storage devices 520 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 530 may include interconnection or network interface components or other suitable devices to communicate with one or more peripheral devices 504 or one or more databases 506 via a network 508. For example, the communication resources 530 may include wired communication components (e.g., for coupling via USB), cellular communication components, NFC components, Bluetooth® (or Bluetooth® Low Energy) components, Wi-Fi® components, and other communication components.

Instructions 550 may comprise software, a program, an application, an applet, an app, or other executable code for causing at least any of the processors 510 to perform any one or more of the methodologies discussed herein. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources 500 from any combination of the peripheral devices 504 or the databases 506. Accordingly, the memory of processors 510, the memory/storage devices 520, the peripheral devices 504, and the databases 506 are examples of computer-readable and machine-readable media.

Protocol Layers

Figure 6:
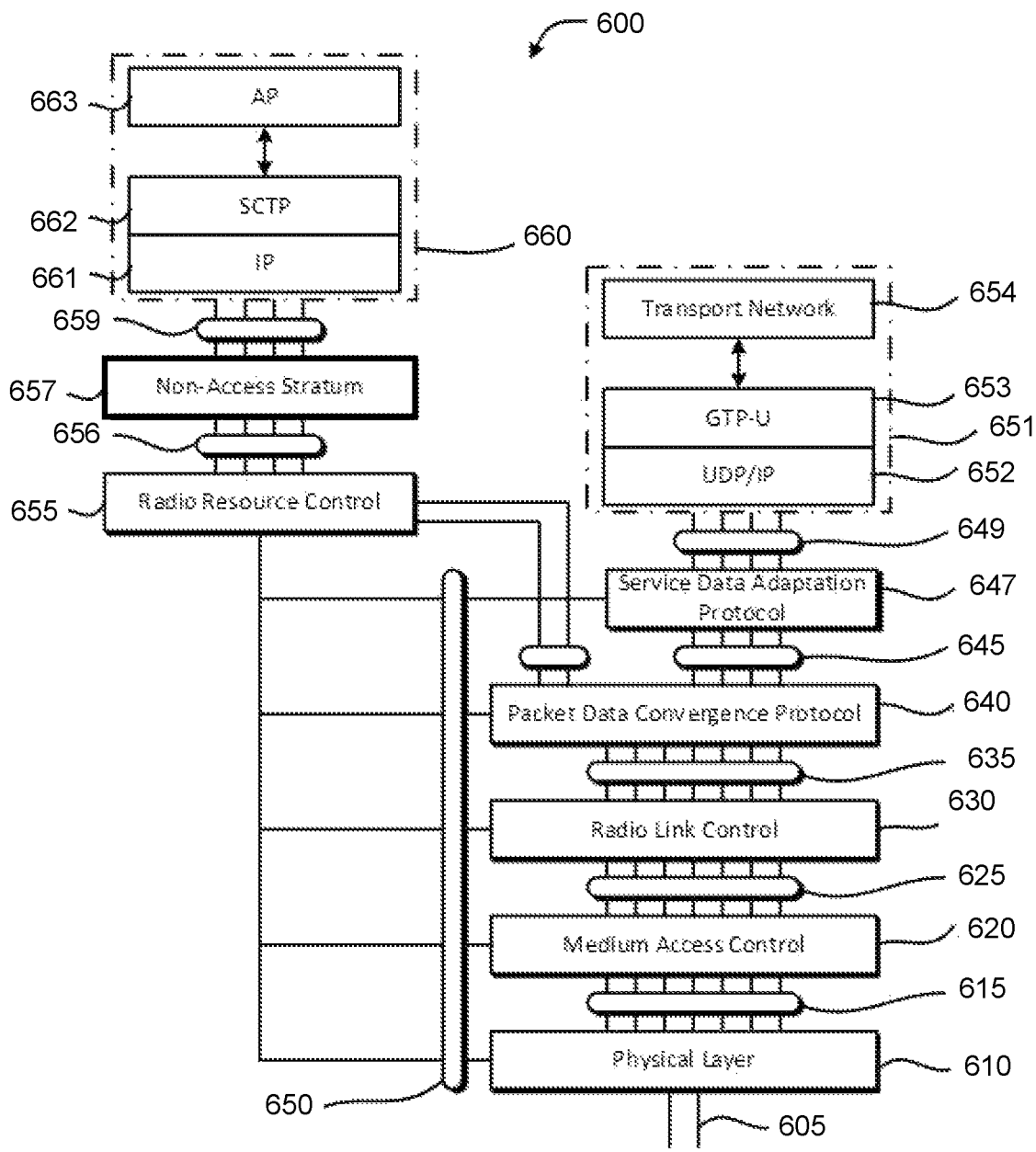
FIG. 6 illustrates various protocol functions that may be implemented in a wireless communication device according to various exemplary embodiments.

FIG. 6 illustrates various protocol functions that may be implemented in a wireless communication device according to various exemplary embodiments. In particular, FIG. 6 includes an arrangement 600 showing interconnections between various protocol layers/entities. The following description of FIG. 6 is provided for various protocol layers/entities that operate in conjunction with the 5G/NR system standards and LTE system standards, but some or all of the aspects of FIG. 6 may be applicable to other wireless communication network systems as well.

The protocol layers of arrangement 600 may include one or more of PHY 610, MAC 620, RLC 630, PDCP 640, SDAP 647, RRC 655, and NAS layer 657, in addition to other higher layer functions not illustrated. The protocol layers may include one or more service access points (SAPs) (e.g., items 659, 656, 650, 649, 645, 635, 625, and 615 in FIG. 6) that may provide communication between two or more protocol layers.

The PHY 610 may transmit and receive physical layer signals 605 that may be received from or transmitted to one or more other communication devices. The physical layer signals 605 may comprise one or more physical channels, such as those discussed herein. The PHY 610 may further perform link adaptation or adaptive modulation and coding (AMC), power control, cell search (e.g., for initial synchronization and handover purposes), and other measurements used by higher layers, such as the RRC 655. The PHY 610 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 610 may process requests from and provide indications to an instance of MAC 620 via one or more PHY-SAP 615. According to some embodiments, requests and indications communicated via PHY-SAP 615 may comprise one or more transport channels.

Instance(s) of MAC 620 may process requests from, and provide indications to, an instance of RLC 630 via one or more MAC-SAPs 625. These requests and indications communicated via the MAC-SAP 625 may comprise one or more logical channels. The MAC 620 may perform mapping between the logical channels and transport channels, multiplexing of MAC SDUs from one or more logical channels onto TBs to be delivered to PHY 610 via the transport channels, de-multiplexing MAC SDUs to one or more logical channels from TBs delivered from the PHY 610 via transport channels, multiplexing MAC SDUs onto TBs, scheduling information reporting, error correction through HARQ, and logical channel prioritization.

Instance(s) of RLC 630 may process requests from and provide indications to an instance of PDCP 640 via one or more radio link control service access points (RLC-SAP) 635. These requests and indications communicated via RLC-SAP 635 may comprise one or more RLC channels. The RLC 630 may operate in a plurality of modes of operation, including: Transparent Mode™, Unacknowledged Mode (UM), and Acknowledged Mode (AM). The RLC 630 may execute transfer of upper layer protocol data units (PDUs), error correction through automatic repeat request (ARQ) for AM data transfers, and concatenation, segmentation and reassembly of RLC SDUs for UM and AM data transfers. The RLC 630 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 640 may process requests from and provide indications to instance(s) of RRC 655 and/or instance(s) of SDAP 647 via one or more packet data convergence protocol service access points (PDCP-SAP) 645. These requests and indications communicated via PDCP-SAP 645 may comprise one or more radio bearers. The PDCP 640 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 647 may process requests from and provide indications to one or more higher layer protocol entities via one or more SDAP-SAP 649. These requests and indications communicated via SDAP-SAP 649 may comprise one or more QoS flows. The SDAP 647 may map QoS flows to DRBs, and vice versa, and may also mark QFIs in DL and UL packets. A single SDAP entity 647 may be configured for an individual PDU session. In the UL direction, the 5G NR-RAN 110 may control the mapping of QoS Flows to DRB(s) in two different ways, reflective mapping or explicit mapping. For reflective mapping, the SDAP 647 of a UE 101 may monitor the QFIs of the DL packets for each DRB, and may apply the same mapping for packets flowing in the UL direction. For a DRB, the SDAP 647 of the UE 101 may map the UL packets belonging to the QoS flows(s) corresponding to the QoS flow ID(s) and PDU session observed in the DL packets for that DRB. To enable reflective mapping, the 5G NR-RAN 110 may mark DL packets over the Uu interface with a QoS flow ID. The explicit mapping may involve the RRC 655 configuring the SDAP 647 with an explicit QoS flow to DRB mapping rule, which may be stored and followed by the SDAP 647. In embodiments, the SDAP 647 may only be used in NR implementations and may not be used in LTE implementations.

The RRC 655 may configure, via one or more management service access points (M-SAP), aspects of one or more protocol layers, which may include one or more instances of PHY 610, MAC 620, RLC 630, PDCP 640 and SDAP 647. In embodiments, an instance of RRC 655 may process requests from and provide indications to one or more NAS entities 657 via one or more RRC-SAPs 656. The main services and functions of the RRC 655 may include broadcast of system information (e.g., included in MIBs or SIBs related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 657 may form the highest stratum of the control plane between the UE 101 and the AMF. The NAS 657 may support the mobility of the UEs 101 and the session management procedures to establish and maintain IP connectivity between the UE 101 and a P-GW in LTE systems.

According to various embodiments, one or more protocol entities of arrangement 600 may be implemented in UEs 101, RAN nodes 111, the AMF in NR implementations or the MME in LTE implementations, UPFs in NR implementations or S-GWs and P-GWs in LTE implementations, or the like to be used for control plane or user plane communications protocol stack between the aforementioned devices. In such embodiments, one or more protocol entities that may be implemented in one or more of UE 101, gNB 111, the AMF, etc. may communicate with a respective peer protocol entity that may be implemented in or on another device using the services of respective lower layer protocol entities to perform such communication. In some embodiments, a gNB-CU of the gNB 111 may host the RRC 655, SDAP 647, and PDCP 640 of the gNB that controls the operation of one or more gNB-DUs, and the gNB-DUs of the gNB 111 may each host the RLC 630, MAC 620, and PHY 510 of the gNB 111.

In a first example, a control plane protocol stack may comprise, in order from highest layer to lowest layer, NAS 557, RRC 555, PDCP 640, RLC 630, MAC 520, and PHY 510. In this example, upper layers 660 may be built on top of the NAS 557, which includes an IP layer 661, an SCTP 662, and an application layer signaling protocol (AP) 663.

In NR implementations, the AP 663 may be a 5G NR application protocol layer (5G NR AP or NR-AP) 663 for the 5G NR interface 113 defined between the 5G NR-RAN node 111 and the AMF, or the AP 663 may be an Xn application protocol layer (XnAP or Xn-AP) 663 for the Xn interface 112 that is defined between two or more RAN nodes 111.

The 5G NR-AP 663 may support the functions of the 5G NR interface 113 and may comprise Elementary Procedures (EPs). A 5G NR-AP EP may be a unit of interaction between the 5G NR-RAN node 111 and the AMF. The 5G NR-AP 663 services may comprise two groups: UE-associated services (e.g., services related to a UE 101) and non-UE-associated services (e.g., services related to the whole 5G NR interface instance between the 5G NR-RAN node 111 and the AMF). These services may include functions including, but not limited to: a paging function for the sending of paging requests to 5G NR-RAN nodes 111 involved in a particular paging area; a UE context management function for allowing the AMF to establish, modify, and/or release a UE context in the AMF and the 5G NR-RAN node 111; a mobility function for UEs 101 in ECM-CONNECTED mode for intra-system HOs to support mobility within 5G NR-RAN and inter-system HOs to support mobility from/to EPS systems; a NAS Signaling Transport function for transporting or rerouting NAS messages between UE 101 and AMF; a NAS node selection function for determining an association between the AMF and the UE 101; 5G NR interface management function(s) for setting up the 5G NR interface and monitoring for errors over the 5G NR interface; a warning message transmission function for providing means to transfer warning messages via 5G NR interface or cancel ongoing broadcast of warning messages; a Configuration Transfer function for requesting and transferring of RAN configuration information (e.g., SON information, performance measurement (PM) data, etc.) between two RAN nodes 111 via CN 120; and/or other like functions.

The XnAP 663 may support the functions of the Xn interface 112 and may comprise XnAP basic mobility procedures and XnAP global procedures. The XnAP basic mobility procedures may comprise procedures used to handle UE mobility within the 5G NR RAN 111 (or E-UTRAN 111), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 101, such as Xn interface setup and reset procedures, 5G NR-RAN update procedures, cell activation procedures, and the like.

In LTE implementations, the AP 663 may be an S1 Application Protocol layer (S1-AP) 663 for the S1 interface 113 defined between an E-UTRAN node 111 and an MME, or the AP 663 may be an X2 application protocol layer (X2AP or X2-AP) 663 for the X2 interface 112 that is defined between two or more E-UTRAN nodes 111.

The S1 Application Protocol layer (S1-AP) 663 may support the functions of the S1 interface, and similar to the 5G NR-AP discussed previously, the S1-AP may comprise S1-AP EPs. An S1-AP EP may be a unit of interaction between the E-UTRAN node 111 and an MME within an LTE CN 120. The S1-AP 663 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 663 may support the functions of the X2 interface 112 and may comprise X2AP basic mobility procedures and X2AP global procedures. The X2AP basic mobility procedures may comprise procedures used to handle UE mobility within the E-UTRAN 120, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 101, such as X2 interface setup and reset procedures, load indication procedures, error indication procedures, cell activation procedures, and the like.

The SCTP layer (alternatively referred to as the SCTP/IP layer) 662 may provide guaranteed delivery of application layer messages (e.g., 5G NRAP or XnAP messages in NR implementations, or S1-AP or X2AP messages in LTE implementations). The SCTP 662 may ensure reliable delivery of signaling messages between the RAN node 111 and the AMF/MME based, in part, on the IP protocol, supported by the IP 661. The Internet Protocol layer (IP) 661 may be used to perform packet addressing and routing functionality. In some implementations the IP layer 661 may use point-to-point transmission to deliver and convey PDUs. In this regard, the RAN node 111 may comprise L2 and L1 layer communication links (e.g., wired or wireless) with the MME/AMF to exchange information.

In a second example, a user plane protocol stack may comprise, in order from highest layer to lowest layer, SDAP 647, PDCP 640, RLC 630, MAC 520, and PHY 510. The user plane protocol stack may be used for communication between the UE 101, the RAN node 111, and UPF in NR implementations or an S-GW and P-GW in LTE implementations. In this example, upper layers 651 may be built on top of the SDAP 647, and may include a user datagram protocol (UDP) and IP security layer (UDP/IP) 652, a General Packet Radio Service (GPRS) Tunneling Protocol for the user plane layer (GTP-U) 653, and a User Plane PDU layer (UP PDU) 663.

The transport network layer 654 (also referred to as a "transport layer") may be built on IP transport, and the GTP-U 653 may be used on top of the UDP/IP layer 652 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 653 may be used for carrying user data within the GPRS core network and between the radio access network and the core network. The user data transported can be packets in any of IPv4, IPv6, or PPP formats, for example. The UDP/IP 652 may provide checksums for data integrity, port numbers for addressing different functions at the source and destination, and encryption and authentication on the selected data flows. The RAN node 111 and the S-GW may utilize an S1-U interface to exchange user plane data via a protocol stack comprising an L1 layer (e.g., PHY 610), an L2 layer (e.g., MAC 620, RLC 630, PDCP 640, and/or SDAP 647), the UDP/IP layer 652, and the GTP-U 653. The S-GW and the P-GW may utilize an S5/S8a interface to exchange user plane data via a protocol stack comprising an L1 layer, an L2 layer, the UDP/IP layer 652, and the GTP-U 653. As discussed previously, NAS protocols may support the mobility of the UE 101 and the session management procedures to establish and maintain IP connectivity between the UE 101 and the P-GW.

Moreover, although not shown by FIG. 6, an application layer may be present above the AP 663 and/or the transport network layer 654. The application layer may be a layer in which a user of the UE 101, RAN node 111, or other network element interacts with software applications being executed, for example, by application circuitry 205 or application circuitry 305, respectively. The application layer may also provide one or more interfaces for software applications to interact with communications systems of the UE 101 or RAN node 111, such as the baseband circuitry 410. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

SSB Patterns for DFT-s-OFDM Waveform for Above 52.6 GHz Carrier Frequency

As discussed above, for systems operating above a 52.6 GHz carrier frequency, a single carrier-based waveform may be used to mitigate issues including low power amplifier (PA) efficiency and large phase noise. In this case, when DFT-s-OFDM is used for the transmission of the PBCH, the SSB pattern and PBCH are redesigned.

Various embodiments for synchronization signal block (SSB) patterns for DFT-s-OFDM waveform for system operating above 52.6 GHz carrier frequency are provided in the following.

In one embodiment of the invention, a DFT-s-OFDM waveform may be employed for the transmission of the PBCH. Further, the PBCH and associated demodulation reference signal (DM-RS) are multiplexed in a time division multiplexing (TDM) manner. Note that the PBCH can span K1 symbol(s) and its associated DMRS can span K2 symbols(s), where K1 and K2 are constant, e.g., K1=1 and K2=1 or 2.

Further, the PBCH and its associated DMRS can occupy N1 PRBs and the PSS/SSS can occupy N2 PRBs, where N1 and N2 are constant. N1 and N2 may be the same or different. In one example, in case when K1=K2=1, N1=36. In another example, when K1=1 and K2=2, N1=18.

Figure 8:
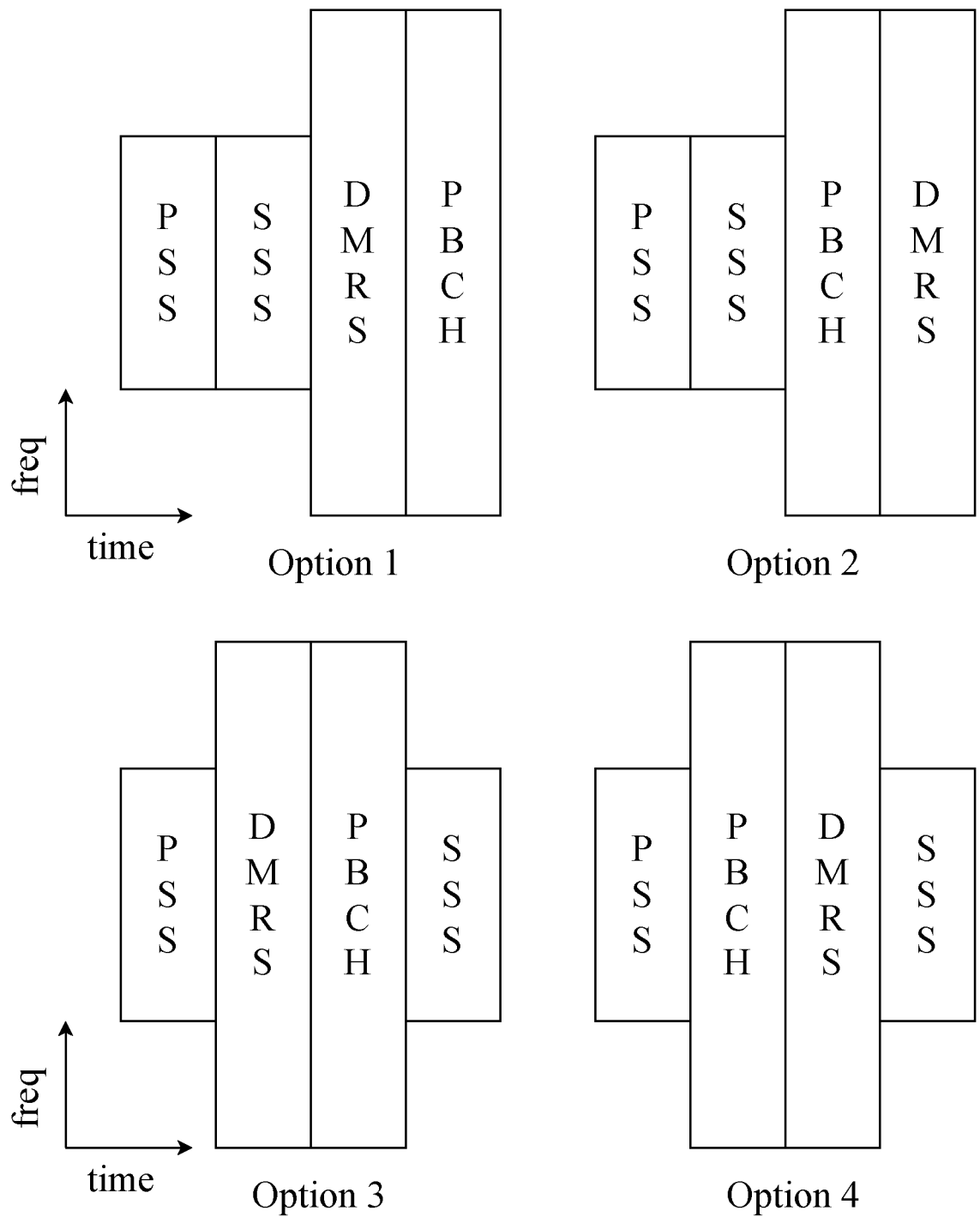
FIG. 8 illustrates four exemplary options for SSB patterns when the PBCH and DMRS span 2 symbols and have different bandwidths from the PSS/SSS.

FIG. 8 illustrates four exemplary options for SSB patterns when the PBCH and DMRS span 2 symbols and have different bandwidths from the PSS/SSS. In the examples shown, the PBCH spans one symbol and the DMRS for the PBCH may be transmitted before or after the PBCH. Further, the SSS may be transmitted before or after the PBCH and its associated DMRS. It is noted that other permutations of PSS/SSS and PBCH/DMRS may not be limited to the following examples.

Figure 9:
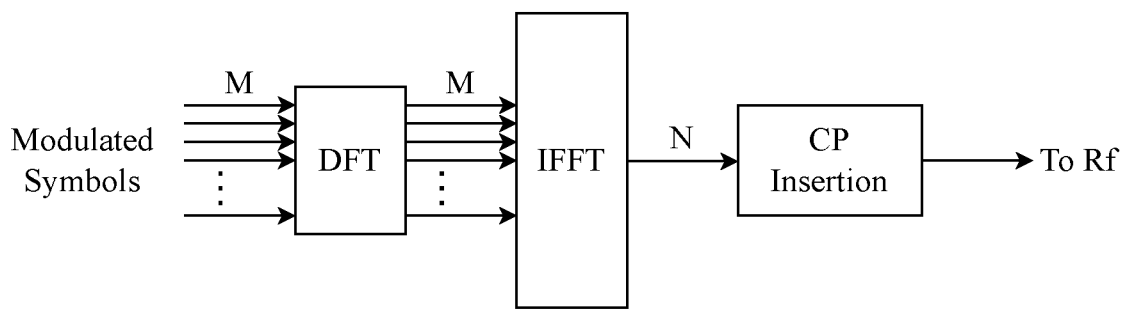
FIG. 9 illustrates the DFT-s-OFDM waveform for the transmission of the PBCH.

In the examples, the frequency domain axis refers to the mapping of signals to subcarriers in the frequency domain. The signals that are mapped to subcarriers in the frequency domain are DFT-spread prior to mapping to the subcarriers in the frequency domain. FIG. 9 illustrates the DFT-s-OFDM waveform for the transmission of the PBCH.

Figure 10:
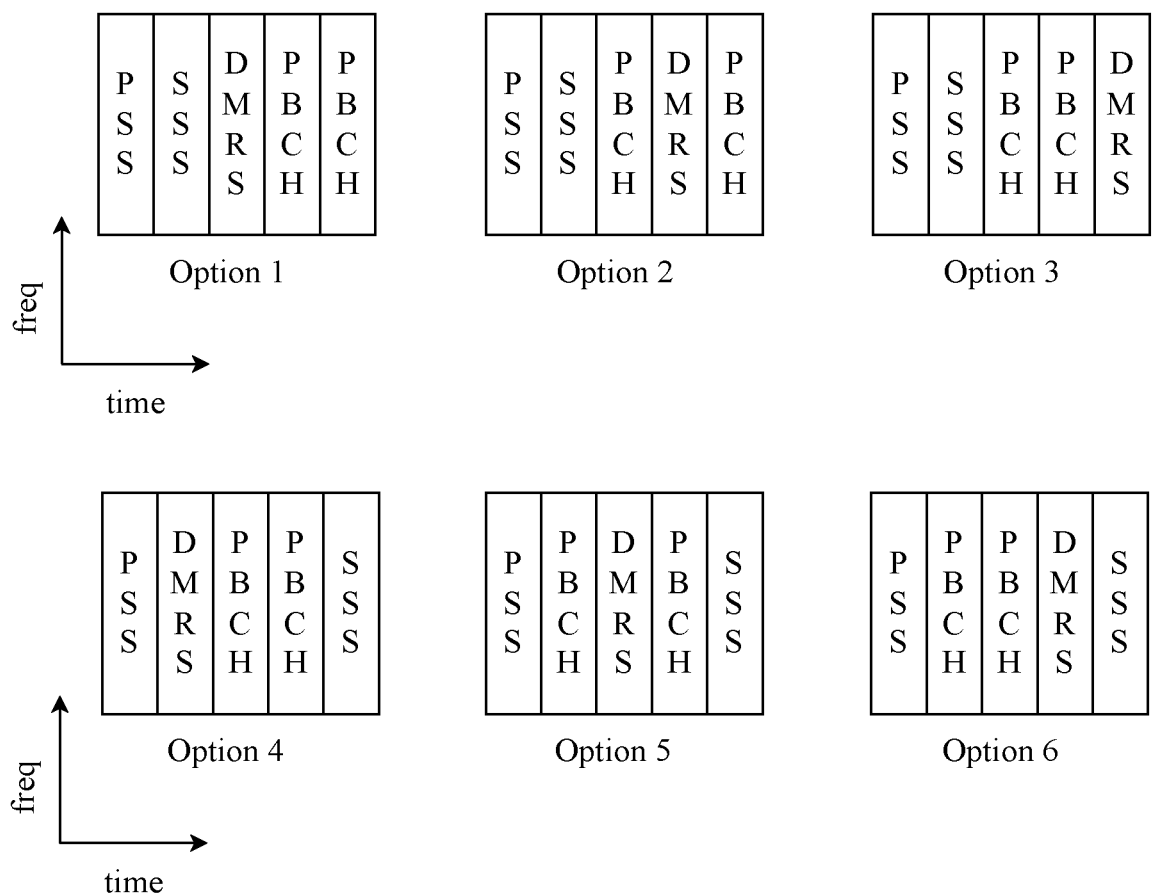
FIG. 10 illustrates examples of SSB patterns when the PBCH and DMRS span 3 symbols and have the same bandwidth as the PSS/SSS.

FIG. 10 illustrates examples of SSB patterns when the PBCH and DMRS span 3 symbols and have the same bandwidth as the PSS/SSS. It is noted that, similar to NR in Rel-15, some unused REs may be reserved on each side of the PSS and SSS transmission in situations where the length of the PSS/SSS is less than the number of REs allocated for the PSS/SSS.

In the examples, the PBCH spans two symbols and the DMRS for the PBCH may be transmitted before or after the PBCH. Further, a same bandwidth is allocated for the transmission of the PBCH/DMRS and the PSS/SSS.

Figure 11:
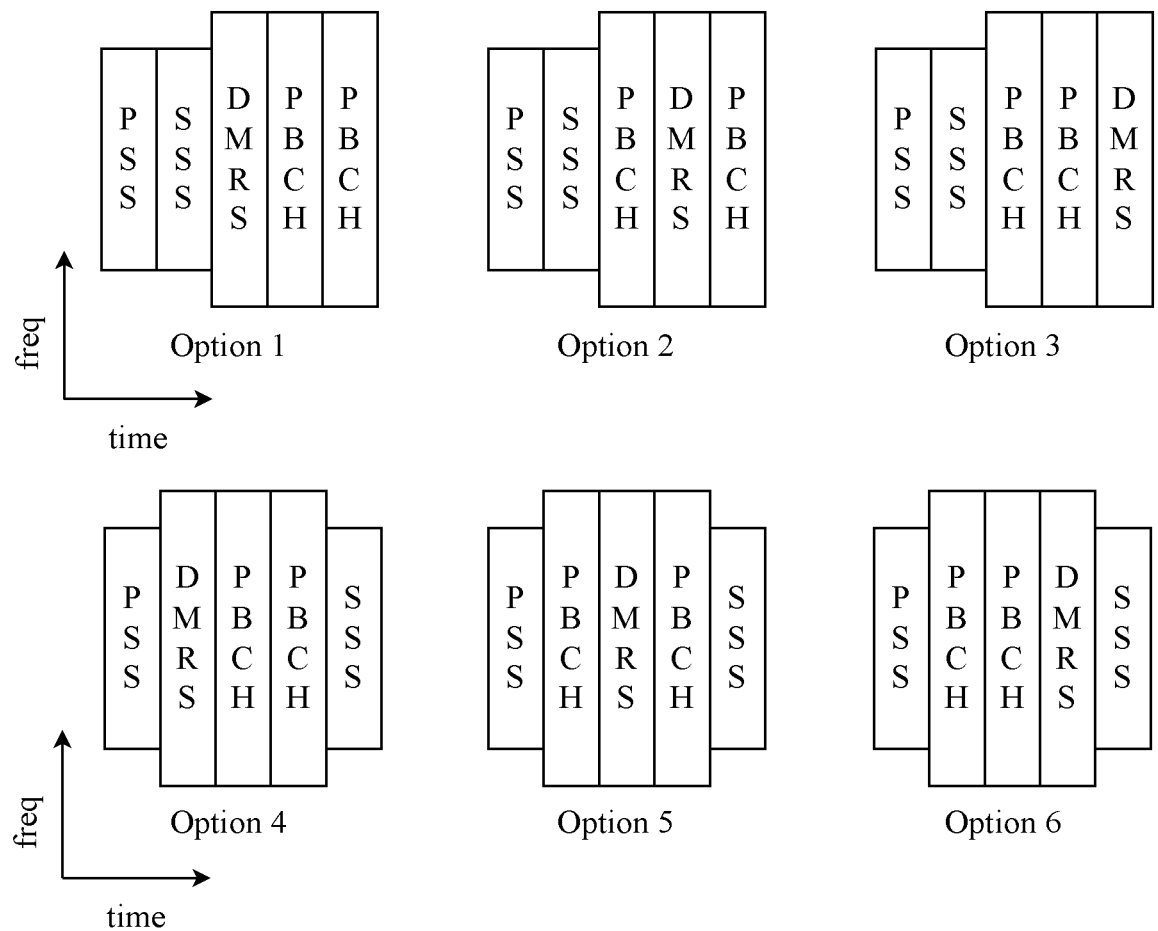
FIG. 11 illustrates examples of SSB patterns when the PBCH and DMRS span 3 symbols and have different bandwidths from the PSS/SSS.

FIG. 11 illustrates examples of SSB patterns when the PBCH and DMRS span 3 symbols and have different bandwidths from the PSS/SSS. In the examples, the PBCH spans two symbols and the DMRS for the PBCH may be transmitted before or after the PBCH. Further, different bandwidths are allocated for the transmission of the PBCH/DMRS and the PSS/SSS.

In another embodiment, given the condition that the DFT-s-OFDM waveform is used for DL transmission for system operations above 52.6 GHz, the SSB may not be multiplexed with other DL signals/channels in a frequency division multiplexing (FDM) manner. In other words, power boosting may be applied for the transmission of the PSS/SSS and the PBCH.

In still another embodiment, similar to the SSB pattern as defined in Rel-15 NR, the number of symbols allocated for SSB for above 52.6 GHz can be 4. In particular, the DMRS may not be present for associated PBCH transmission in the SSB but the channel for the PBCH may be referred from the SSS, which indicates that the UE may first detect the SSS and estimate the channel for the PBCH decoding. In this case, the same frequency resource is allocated for the transmission of the SSS and the PBCH. Further, in this embodiment, the SSS can be used to carry both an SSB time index and partial cell ID information.

It is noted that the PBCH may span K1 symbol(s), e.g., K1=2. Further, the SSS and PBCH may span N1 PRBs, e.g., N1=18 or 20. In one option, in a situation where N1 is less than 20 PRBs, unused PRBs or subcarriers are reserved with zero power, which can match the SSB as defined in Rel-15 NR.

Figure 12:
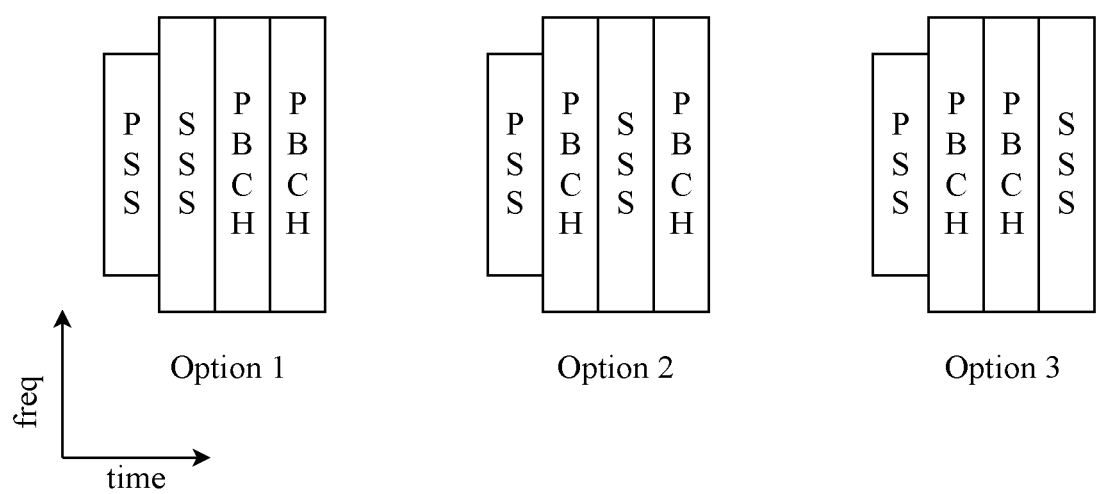
FIG. 12 illustrates examples of SSB patterns when the SSS is used as the DMRS for the PBCH.

FIG. 12 illustrates examples of SSB patterns when the SSS is used as the DMRS for the PBCH. In the examples, the PBCH spans 2 symbols. The SSS and PBCH occupy a same number of PRBs in the frequency domain.

In another embodiment, similar to the SSB pattern as defined in Rel-15 NR, the number of symbols allocated for the SSB for above 52.6 GHz can be 4. In particular, the DMRS and the SSS can be allocated in the same symbol and multiplexed in a time division multiplexing (TDM) manner prior to DFT operation. Similar to the above example, a same frequency resource is allocated for the SSS and DMRS and the PBCH. In this option, the DMRS may be used to carry the SSB time index and SSS may be used to carry partial cell ID information.

Figure 13:
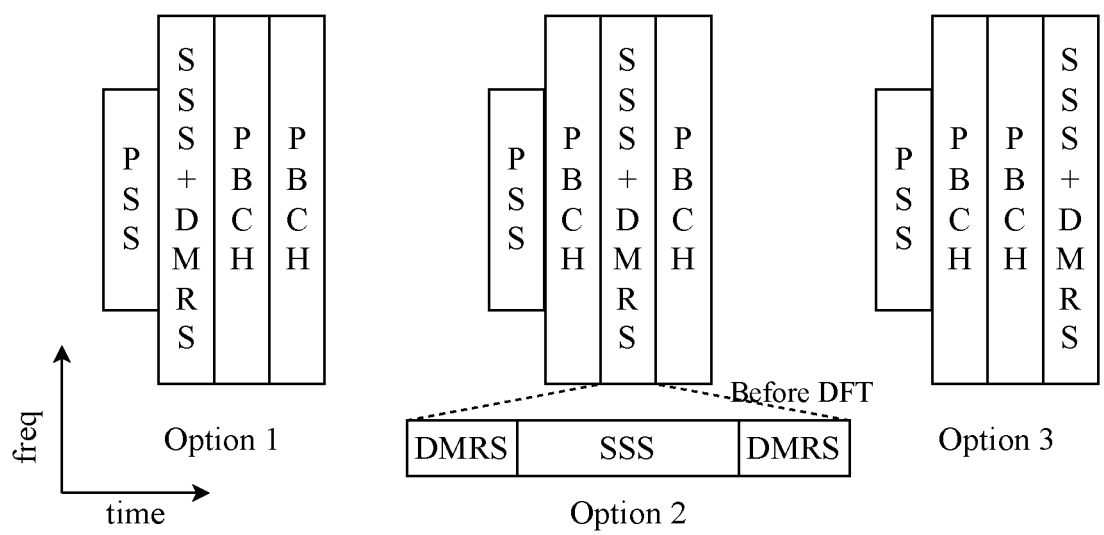
FIG. 13 illustrates examples of SSS patterns when the SSS and DMRS are used for channel estimation of the PBCH.

FIG. 13 illustrates examples of SSS patterns when the SSS and DMRS are used for channel estimation of the PBCH. In the example, the PBCH spans 2 symbols. The SSS/DMRS and PBCH occupy a same number of PRBs in frequency domain.

DMRS Design for PBCH for Above 52.6 GHz Carrier Frequency

As discussed above, to reduce the PAPR for system operations above a 52.6 GHz carrier frequency, a DFT-s-OFDM based waveform can be applied for DL transmission. In this case, a DMRS with a low PAPR property may be used. Various exemplary embodiments of DMRS designs for PBCH for system operations above a 52.6 GHz carrier frequency are provided as follows.

In one embodiment, a Zadoff-Chu (ZC) sequence can be used for DM-RS sequence generation. In particular, the root index and/or cyclic shift of a ZC sequence for a DMRS sequence generation can be defined as a function of one or more of the following parameters: cell ID, partial or full SSB index, and half radio frame index. In one example, the root index of a ZC sequence can be defined as a function of cell ID, partial or full SSB index and/or half radio frame index. In addition, the cyclic shift of a ZC sequence can be predefined in the specification, e.g., fixed to 0.

In another example, the root index of a ZC sequence can be defined as a function of cell ID. In addition, the cyclic shift of a ZC sequence can be defined as a function of a partial or full SSB index and/or half radio frame index. In yet another example, only a part of the cell ID is used to define the root index of the ZC sequence and the rest of the cell ID is used to define the cyclic shift of this ZC sequence, potentially together with other parameters such as the SSB index and the half radio frame index.

In another embodiment, a max length sequence (m-sequence) or Gold code sequence modulated using pi/2-BPSK modulation can be used as the DMRS sequence. In this case, the expression of the initialization value of the linear feedback shift register (LFSR), used for generation of m-sequences or Gold codes, includes at least cell ID. In some examples, the initialization value is based on the full SSB index and/or half radio frame index or a part of the SSB index and/or half radio frame index in addition to the cell ID. In other examples, different cyclic shifts of the m-sequence or Gold code sequence are used for different SSB indices and/or half radio frame indices.

In another embodiment, a Bjorck Constant Amplitude Zero Auto Correlation (CAZAC) sequence can be used as the DMRS sequence. In this case, different cyclic shifts of the Bjorck CAZAC sequence correspond to different combinations of cell ID, a part of the SSB index or the full SSB index and/or a half radio frame.

In another embodiment, the DMRS may occupy K REs within one PRB, e.g., K=3, 4, 6, 12. In situations where the DMRS is not fully occupied within one PRB, the remaining REs are unused and in this case, power boosting can be applied. In other words, the relative power between DMRS and PBCH can be 10 log 10(12/K)dB. Similar to NR Rel-15, different cells may use different DMRS REs for DMRS transmission. In particular, a frequency shift for DMRS REs can be v_shift=N_ID^Cell mod(12/K).

Figure 14:
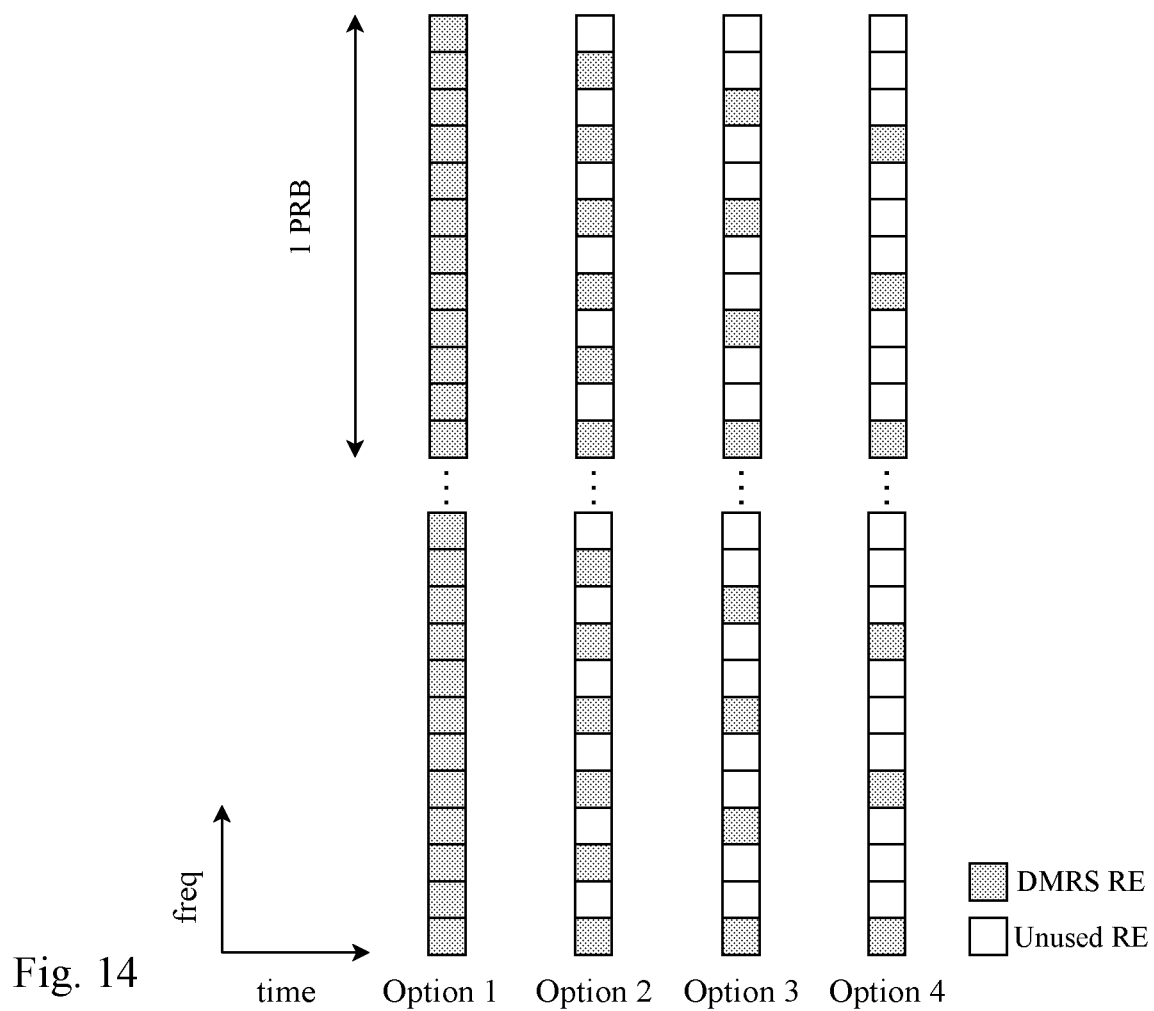
FIG. 14 illustrates examples of DMRS patterns for the PBCH.

FIG. 14 illustrates examples of DMRS patterns for the PBCH. In the examples, the number of DMRS REs within one PRBs is 12, 6, 4 and 3, respectively.

In another embodiment, the sequence of the DMRS for PBCH can be determined by cell ID and/or SSB timing index. The SSB timing index can be used by the UE to infer the location of the said SSB within the frame boundary. The SSB timing index may also be used by the UE to determine the Tx beam identification for measurement reporting purposes. In a situation where the number of bits required for the SSB timing index is large, a portion of the SSB timing index can be used to determine the sequence of DMRS.

It is noted that the above DMRS sequence design may be applied for the SSS sequence design. This may be considered when the SSS is used for channel estimation for the PBCH decoding.

Figure 15:
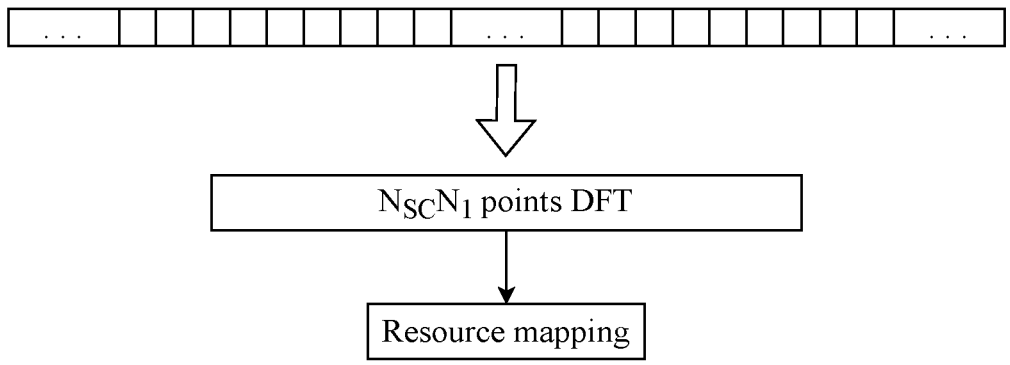
FIG. 15 illustrates an example for PT-RS and PBCH multiplexing in one PBCH symbol, where Nsc indicates the number of subcarriers per RB.

In another embodiment, the phase tracking reference signal (PT-RS) can be associated with the PBCH before DFT to assist phase shift compensation for PBCH decoding. The PT-RS can be multiplexed in a uniform or non-uniform manner. In one example, there can be N, e.g. N=2, PT-RS groups in an OFDM symbol, where each group include M, e.g. M=2, consecutive symbols. The sequence of PT-RS may be generated based on Pi/2 BPSK, which can be scrambled based on cell ID and/or symbol/slot index. FIG. 15 illustrates an example for PT-RS and PBCH multiplexing in one PBCH symbol, where Nsc indicates the number of subcarriers per RB.

The electronic device(s), network(s), system(s), chip(s) or component(s), or portions or implementations thereof, of FIGS. 1-6 may be configured to perform one or more processes, techniques, or methods as described herein, or portions thereof.

Figure 16:
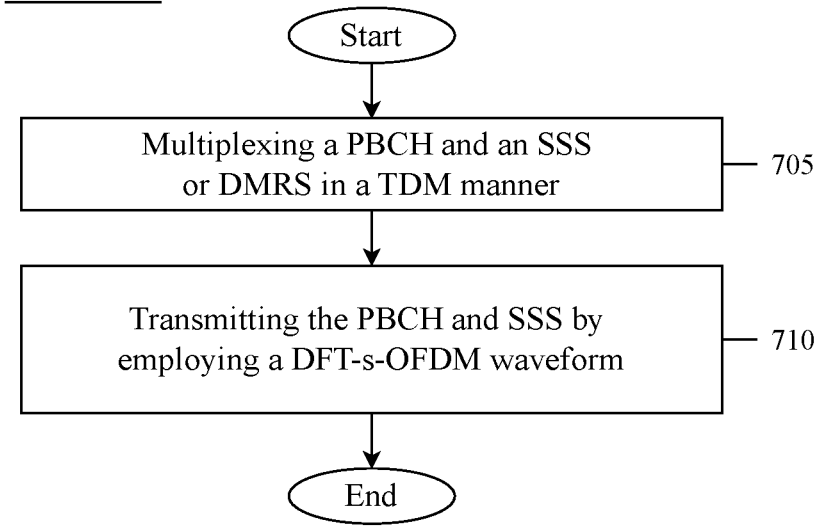
FIG. 16 shows a method for transmitting an SSB in 5G NR according to various exemplary embodiments described herein.

FIG. 16 shows a method 700 for transmitting an SSB in 5G NR according to various exemplary embodiments described herein. The method 700 may be executed by components of a gNB for downlink transmissions to a user equipment. For example, in some embodiments, the process may be performed by baseband circuitry, for example, baseband circuitry 210.

The process may include, at 705, multiplexing the PBCH and an SSS or DMRS in a TDM manner. The multiplexed PBCH and SSS/DMRS may be part of a synchronization signal block (SSB) that further includes a PSS.

The process may further include, at 710, transmitting or causing transmission of, the PBCH and SSS by employing a DFT-s-OFDM waveform. In some embodiments, the baseband circuitry may employ a DFT-s-OFDM waveform by peforming the DFT, IFFT, and CP insertion as shown in FIG. 9 and described in the related description. The baseband circuitry may then provide the waveform to RF circuitry, for example, RFEM 215, for downlink transmission to a UE, for example, UE 101a or 101b.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method of wireless communication for a fifth generation (5G) or new radio (NR) system: multiplexing, by a gNodeB (gNB), a physical broadcast channel (PBCH) and associated demodulation reference signal (DMRS) in a time division multiplexing (TDM) manner; transmitting, by the gNB, the PBCH by employing a Discrete Fourier Transform-spread-orthogonal frequency-division multiplexing (DFT-s-OFDM) waveform and its associated DMRS.

Example 2 may include the method of example 1 or some other example herein, wherein the PBCH spans K1 symbol(s) and its associated DMRS spans K2 symbols(s), where K1 and K2 are constant, e.g., K1=1 and K2=1 or 2.

Example 3 may include the method of example 1 or some other example herein, wherein the PBCH and its associated DMRS occupy N1 PRBs and a primary synchronization signal (PSS) and a secondary synchronization signal (SSS) occupy N2 PRBs, where N1 and N2 are constant; wherein N1 and N2 may be same or different.

Example 4 may include the method of example 1 or some other example herein, wherein a synchronization signal block (SSB) is not multiplexed with other DL signals/channels in a frequency division multiplexing (FDM) manner.

Example 5 may include the method of example 1 or some other example herein, wherein a channel for the PBCH is referred from the SSS; wherein a same frequency resource is allocated for the transmission of SSS and PBCH; wherein SSS is used to carry both SSB time index and partial cell ID information.

Example 6 may include the method of example 1 or some other example herein, wherein DMRS and SSS are allocated in the same symbol and multiplexed in a time division multiplexing (TDM) manner prior to DFT operation; wherein DMRS is used to carry the SSB time index and SSS may be used to carry partial cell ID information.

Example 7 may include the method of example 1 or some other example herein, wherein a Zadoff-Chu (ZC) sequence is used for the DMRS sequence generation.

Example 8 may include the method of example 7 or some other example herein, wherein a root index and/or a cyclic shift of the ZC sequence for DMRS sequence generation is defined as a function of one or more the following parameters: cell ID, partial or full SSB index, half radio frame index.

Example 9 may include the method of example 1 or some other example herein, wherein a max length sequence (m-sequence) or a Gold code sequence modulated using pi/2-BPSK modulation is used as the DMRS sequence.

Example 10 may include the method of example 7 or some other example herein, wherein an initialization seed of the M-sequence includes a cell ID, a full SSB index and/or a half radio frame index or a part of the SSB index and/or the half radio frame index.

Example 11 may include the method of example 1 or some other example herein, wherein a Bjorck Constant Amplitude Zero Auto Correlation (CAZAC) sequence is used as the DMRS sequence.

Example 12 may include the method of example 1 or some other example herein, wherein the DMRS occupies K resource elements (RE) within one physical resource block (PRB), wherein K is a constant.

Example 13 may include the method of example 1 or some other example herein, wherein when DMRS is not fully occupied within one PRB, the remaining REs are unused and power boosting can be applied, wherein the relative power between DMRS and PBCH can be 10 log 10(12/K)dB.

Example 14 may include the method of example 1 or some other example herein, wherein a sequence of the DMRS for the PBCH is determined by a cell ID and/or an SSB timing index.

Example 15 may include the method of example 1 or some other example herein, wherein a phase tracking reference signal (PT-RS) is associated with the PBCH before DFT operation.

Example 16 may include a method of operating a gNB in a fifth generation (5G) or new radio (NR) system, the method comprising: multiplexing a physical broadcast channel (PBCH) and a secondary synchronization signal (SSS) in a time division multiplexing (TDM) manner; and transmitting, or causing transmission of, the PBCH and the SSS by employing a Discrete Fourier Transform-spread-orthogonal frequency-division multiplexing (DFT-s-OFDM) waveform.

Example 17 may include the method of example 16 or some other example herein, wherein the PBCH is on two symbols and the SSS is on one symbol.

Example 18 may include the method of example 17 or some other example herein, wherein the PBCH is on two consecutive symbols and the symbol on which the SSS is carried is immediately before or immediately after the two consecutive symbols that carry the PBCH.

Example 19 may include the method of example 16 or some other example herein, wherein the SSS and the PBCH occupy a same number of physical resource blocks in frequency domain.

Example 20 may include the method of example 16 or some other example herein, wherein the SSS is allocated in a same symbol as a DMRS and multiplexed in a TDM manner prior to DFT operation.

Example 21 may include the method of example 20 or some other example herein, wherein the DMRS carries a synchronization signal block time index and the SSS carries partial cell identification information.

Example 22 may include the method of example 16 or some other example herein, wherein the SSS is allocated in a same symbol is a DMRS and the SSS/DMRS occupy a same number of physical resource blocks in frequency domain as the PBCH.

Example 23 may include the method of example 16 or some other example herein, wherein the SSS is to carry a synchronization signal block time index and partial cell identification information.

Example Z01 may include an apparatus comprising means to perform one or more elements of a method described in or related to any of examples 1-23, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-23, or any other method or process described herein.

Example Z03 may include an apparatus comprising logic, modules, or circuitry to perform one or more elements of a method described in or related to any of examples 1-23, or any other method or process described herein.

Example Z04 may include a method, technique, or process as described in or related to any of examples 1-23, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-23, or portions thereof.

Example Z06 may include a signal as described in or related to any of examples 1-23, or portions or parts thereof.

Example Z07 may include a datagram, packet, frame, segment, protocol data unit (PDU), or message as described in or related to any of examples 1-23, or portions or parts thereof, or otherwise described in the present disclosure.

Example Z08 may include a signal encoded with data as described in or related to any of examples 1-23, or portions or parts thereof, or otherwise described in the present disclosure.

Example Z09 may include a signal encoded with a datagram, packet, frame, segment, protocol data unit (PDU), or message as described in or related to any of examples 1-23, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-23, or portions thereof.

Example Z11 may include a computer program comprising instructions, wherein execution of the program by a processing element is to cause the processing element to carry out the method, techniques, or process as described in or related to any of examples 1-23, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A processor of a base station configured to perform operations, comprising:
    multiplexing a physical broadcast channel (PBCH), an associated demodulation reference signal (DMRS), a primary synchronization signal (PSS) and a secondary synchronization signal (SSS) using time division multiplexing (TDM), wherein the DMRS and the SSS are allocated in a same symbol and multiplexed using TDM within the same symbol prior to DFT operation, wherein the DMRS comprises a synchronization signal block (SSB) time index and the SSS comprises partial cell ID information, wherein the DMRS occupies one or more resource elements (REs) within a physical resource block (PRB) and does not fully occupy the PRB, wherein a remaining one or more REs within the PRB are unused and power boosting is applied to provide a higher power to the DMRS relative to the PBCH; and
    transmitting the PBCH, the associated DMRS, the PSS and the SSS using an orthogonal frequency division multiplexing (OFDM) waveform.

2. The processor of claim 1, wherein the PBCH spans a first number of symbols (K1) and the associated DMRS spans a second number of symbols (K2), wherein K1 and K2 are constant.

3. The processor of claim 1, wherein the PBCH and the associated DMRS occupy N1 PRBs and the PSS and the SSS occupy N2 PRBs, where N1 and N2 are constant.

4. The processor of claim 1, wherein a synchronization signal block (SSB) is not multiplexed with other DL signals/channels in a frequency division multiplexing (FDM) manner.

5. The processor of claim 1, wherein a channel for the PBCH is referred from the SSS, wherein a same frequency resource is allocated for the transmission of the SSS and the PBCH.

6. The processor of claim 1, wherein a Zadoff-Chu (ZC) sequence is used for the DMRS sequence generation.

7. The processor of claim 6, wherein a root index and/or a cyclic shift of the ZC sequence for DMRS sequence generation is defined as a function of one or more the following parameters: a cell ID, a partial or a full synchronization signal block (SSB) index, and a half radio frame index.

8. The processor of claim 1, wherein a max length sequence (m-sequence) or a Gold code sequence modulated using pi/2-binary phase shift keying (BPSK) modulation is used as the DMRS sequence.

9. The processor of claim 1, wherein a Bjorck Constant Amplitude Zero Auto Correlation (CAZAC) sequence is used as the DMRS sequence.

10. The processor of claim 1, wherein a relative power between the DMRS and the PBCH is at least 10 log 10(12/K)dB.

11. The processor of claim 1, wherein a sequence of the DMRS for the PBCH is determined by a cell ID and/or a synchronization signal block (SSB) timing index.

12. The processor of claim 1, wherein a phase tracking reference signal (PT-RS) is associated with the PBCH before DFT operation.

13. The processor of claim 1, wherein transmitting the PBCH, the associated DMRS, the PSS and the SSS by employing DFT-s-OFDM waveform is performed on a carrier frequency above 52.6 giga hertz (GHz).

14. A base station, comprising:
baseband circuitry configured for multiplexing a physical broadcast channel (PBCH), an associated demodulation reference signal (DMRS), a primary synchronization signal (PSS) and a secondary synchronization signal (SSS) using time division multiplexing (TDM), wherein the DMRS and the SSS are allocated in a same symbol and multiplexed using TDM within the same symbol prior to DFT operation, wherein the DMRS comprises a synchronization signal block (SSB) time index and the SSS comprises partial cell ID information, wherein the DMRS occupies one or more resource elements (REs) within a physical resource block (PRB) and does not fully occupy the PRB, wherein a remaining one or more REs within the PRB are unused and power boosting is applied to provide a higher power to the DMRS relative to the PBCH; and
radio front end circuitry configured for transmitting the PBCH, the associated DMRS, the PSS and the SSS using an orthogonal frequency division multiplexing (OFDM) waveform.

15. The base station of claim 14, wherein a synchronization signal block (SSB) is not multiplexed with other DL signals/channels in a frequency division multiplexing (FDM) manner.

16. The base station of claim 14, wherein a Zadoff-Chu (ZC) sequence is used for the DMRS sequence generation.

17. The base station of claim 16, wherein a root index and/or a cyclic shift of the ZC sequence for DMRS sequence generation is defined as a function of a half radio frame index.

18. The base station of claim 14, wherein a max length sequence (m-sequence) or a Gold code sequence modulated using pi/2-binary phase shift keying (BPSK) modulation is used as the DMRS sequence.

19. The base station of claim 14, wherein transmitting the PBCH, the associated DMRS, the PSS and the SSS by employing DFT-s-OFDM waveform is performed on a carrier frequency above 52.6 giga hertz (GHz).

20. A method performed by a base station, comprising:
multiplexing a physical broadcast channel (PBCH), an associated demodulation reference signal (DMRS), a primary synchronization signal (PSS) and a secondary synchronization signal (SSS) using time division multiplexing (TDM), wherein the DMRS and the SSS are allocated in a same symbol and multiplexed using TDM within the same symbol prior to DFT operation, wherein the DMRS comprises a synchronization signal block (SSB) time index and the SSS comprises partial cell ID information, wherein the DMRS occupies one or more resource elements (REs) within a physical resource block (PRB) and does not fully occupy the PRB, wherein a remaining one or more REs within the PRB are unused and power boosting is applied, to provide a higher power to the DMRS relative to the PBCH; and
transmitting the PBCH, the associated DMRS, the PSS and the SSS using an orthogonal frequency division multiplexing (OFDM) waveform.

* * * * *